US012602677B2

(12) United States Patent　　(10) Patent No.:　US 12,602,677 B2

Tsuboi　　(45) Date of Patent:　Apr. 14, 2026

(54) SALES TRANSACTION PROCESSING SYSTEM, SALES TRANSACTION PROCESSING APPARATUS, AND METHOD PERFORMED BY SALES TRANSACTION PROCESSING APPARATUS

(71) Applicant: Toshiba Tec Kabushiki Kaisha, Tokyo (JP)

(72) Inventor: Haruki Tsuboi, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 122 days.

(21) Appl. No.: 18/515,141

(22) Filed: Nov. 20, 2023

(65) Prior Publication Data

US 2024/0273499 A1　Aug. 15, 2024

(30) Foreign Application Priority Data

Feb. 15, 2023　(JP) ................................. 2023-021908

(51) Int. Cl.
*G06Q 20/20*　　(2012.01)

(52) U.S. Cl.
CPC .................................. *G06Q 20/202* (2013.01)

(58) Field of Classification Search
CPC .................................................. G06Q 20/202
See application file for complete search history.

(56) References Cited

U.S. PATENT DOCUMENTS

2016/0232506 A1 * 8/2016 Gotanda .............. G06Q 20/047
2017/0091767 A1 * 3/2017 Yabu .................... G06Q 20/382
2017/0132602 A1 * 5/2017 Susaki ................... G06Q 20/20
2017/0221036 A1 * 8/2017 Miyakawa ............. G06Q 20/20
2017/0228716 A1 * 8/2017 Sugita ................ G06K 7/10861
2019/0272520 A1 * 9/2019 Tsuchiya .............. G06Q 20/209
(Continued)

FOREIGN PATENT DOCUMENTS

JP　　2005-084759 A　　3/2005
JP　　2012-198729 A　　10/2012
(Continued)

OTHER PUBLICATIONS

Lawal, Sakiru Abiola. "A critical analysis of point of sales (pos) types and their efficiency for business." International Journal of Eminent Scholars 8.1 (2022). (Year: 2022).*

(Continued)

*Primary Examiner* — Nathan A Mitchell

(74) *Attorney, Agent, or Firm* — Kim & Stewart LLP

(57)　　ABSTRACT

A system includes terminals installed in a store and configured to register an item in a transaction, first devices for executing the transaction, and an apparatus including: an interface connectable to the terminals and devices, a memory that stores first data that associates each terminal with one first device, and a processor configured to: upon receipt of a notification indicating one first device from a first terminal, update the first data to associate the first terminal with said one first device, upon receipt of a registration request from the first terminal, generate second data for a transaction in association with said one first device, and upon receipt of a change request from a second terminal, update the first data to associate the second terminal with said one first device.

20 Claims, 12 Drawing Sheets

(56)                    References Cited

U.S. PATENT DOCUMENTS

| 2019/0272712 A1* | 9/2019 | Taya .................... G07G 1/0018 |
| 2021/0337403 A1 | 10/2021 | Jang et al. |
| 2023/0031146 A1 | 2/2023 | Mori |
| 2024/0177169 A1* | 5/2024 | Hirano ..................... G07G 1/12 |
| 2025/0156829 A1* | 5/2025 | Sugiyama ............. G06Q 20/18 |

FOREIGN PATENT DOCUMENTS

| JP | 2020-126389 A | 8/2020 |
| JP | 2022-076091 A | 5/2022 |
| JP | 2022-082647 A | 6/2022 |
| KR | 2019-0096870 A | 8/2019 |
| KR | 2022-0096147 A | 7/2022 |
| KR | 2022-0153641 A | 11/2022 |

OTHER PUBLICATIONS

Korean Office Action dated Aug. 25, 2025, mailed in counterpart Korean Application No. 10-2023-0151456, 12 pages (with translation).
Japanese Office Action dated Jan. 6, 2026, mailed in counterpart Japanese Application No. 2023-021908, 10 pages (with translation).

* cited by examiner

*FIG. 4*

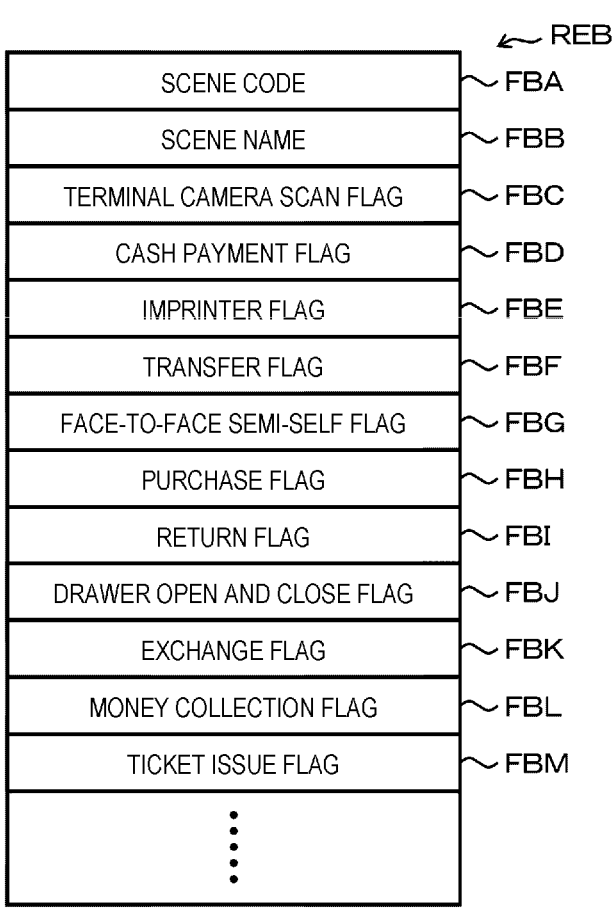

~ REB

| | |
|---|---|
| SCENE CODE | ~ FBA |
| SCENE NAME | ~ FBB |
| TERMINAL CAMERA SCAN FLAG | ~ FBC |
| CASH PAYMENT FLAG | ~ FBD |
| IMPRINTER FLAG | ~ FBE |
| TRANSFER FLAG | ~ FBF |
| FACE-TO-FACE SEMI-SELF FLAG | ~ FBG |
| PURCHASE FLAG | ~ FBH |
| RETURN FLAG | ~ FBI |
| DRAWER OPEN AND CLOSE FLAG | ~ FBJ |
| EXCHANGE FLAG | ~ FBK |
| MONEY COLLECTION FLAG | ~ FBL |
| TICKET ISSUE FLAG | ~ FBM |

*FIG. 5*

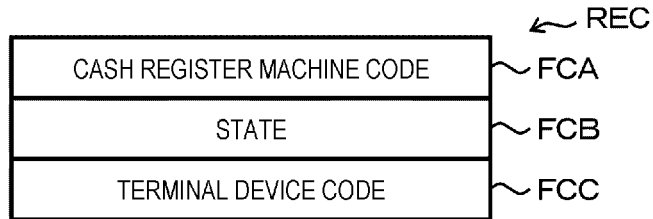

~ REC

| | |
|---|---|
| CASH REGISTER MACHINE CODE | ~ FCA |
| STATE | ~ FCB |
| TERMINAL DEVICE CODE | ~ FCC |

*FIG. 9*

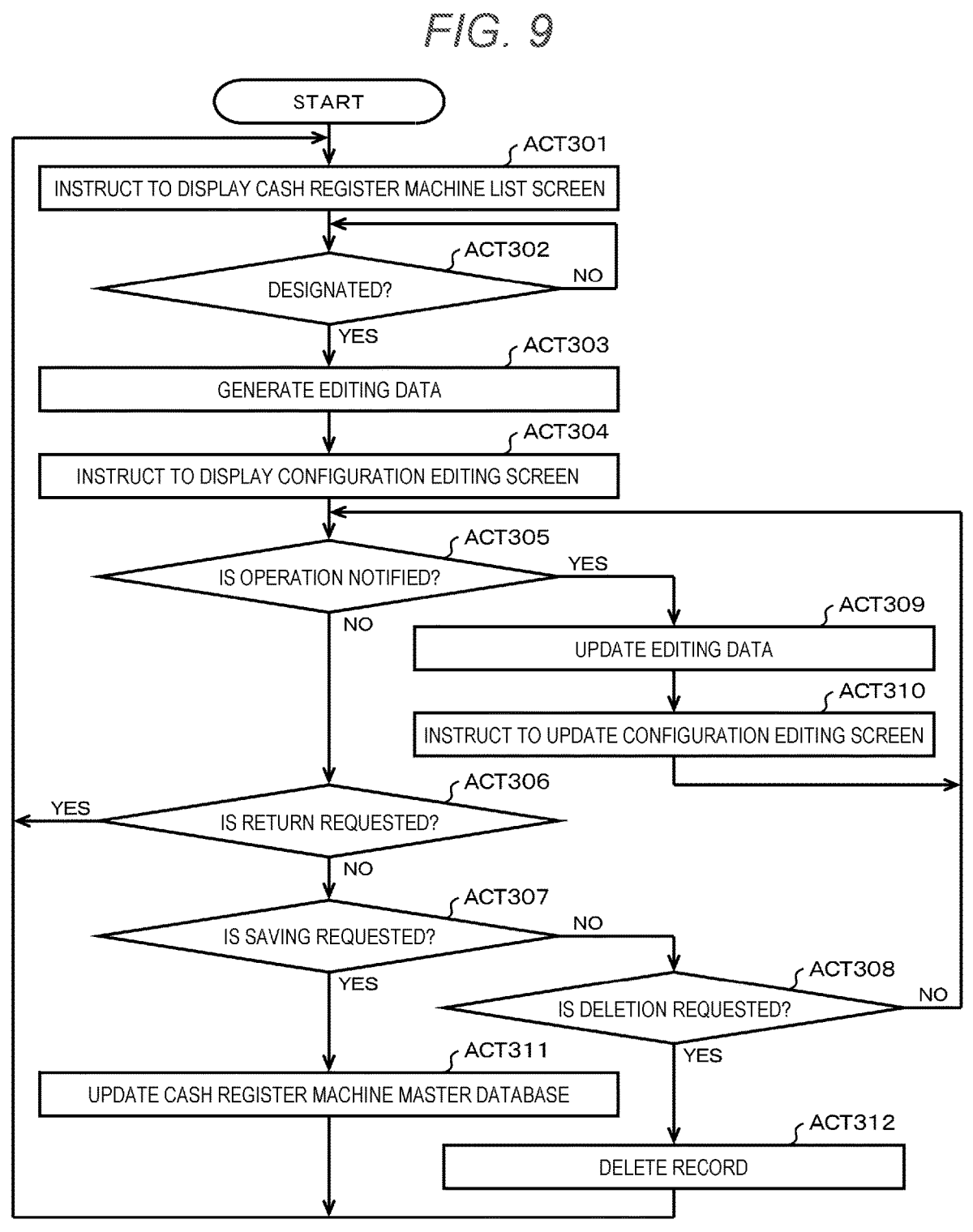

```
                    ┌──────────────┐
                    │    START     │
                    └──────┬───────┘
                           │                  ┌ACT301
        ┌──────────────────▼──────────────────────────────┐
        │ INSTRUCT TO DISPLAY CASH REGISTER MACHINE LIST SCREEN │
        └──────────────────┬──────────────────────────────┘
                           │                  ┌ACT302
                    ◇──────▼──────◇   NO
                    DESIGNATED?
                           │ YES             ┌ACT303
        ┌──────────────────▼─────────────────┐
        │        GENERATE EDITING DATA        │
        └──────────────────┬─────────────────┘
                           │                  ┌ACT304
        ┌──────────────────▼──────────────────────────────┐
        │  INSTRUCT TO DISPLAY CONFIGURATION EDITING SCREEN  │
        └──────────────────┬──────────────────────────────┘
```

ACT305 IS OPERATION NOTIFIED?　YES

ACT309 UPDATE EDITING DATA

ACT310 INSTRUCT TO UPDATE CONFIGURATION EDITING SCREEN

ACT306 IS RETURN REQUESTED?　YES / NO

ACT307 IS SAVING REQUESTED?　NO

ACT308 IS DELETION REQUESTED?　NO

ACT311 UPDATE CASH REGISTER MACHINE MASTER DATABASE

ACT312 DELETE RECORD

*FIG. 10*

| CASH REGISTER MACHINE MASTER      EDIT | | | |
|---|---|---|---|
| TOTAL 7 | | | |
| CODE | NAME | PAYMENT SCENE | EDIT |
| 0001 | PERMANENT FACE-TO-FACE SEMI-SELF_1 | A: STATIONARY FACE-TO-FACE SEMI | ✎ |
| 0002 | PERMANENT FACE-TO-FACE SEMI-SELF_2 | A: STATIONARY FACE-TO-FACE SEMI | ✎ |
| 0003 | S COUNTER TERMINAL | E: RELATED-ART FACE-TO-FACE CASH REGISTER | ✎ |
| 0004 | PROVISIONAL CASH REGISTER_1 | B: TABLET PROVISIONAL | ✎ |
| 0005 | PROVISIONAL CASH REGISTER_2 | B: TABLET PROVISIONAL | ✎ |
| 0006 | PROVISIONAL CASH REGISTER_3 | B: TABLET PROVISIONAL | ✎ |
| 0007 | SALES FLOOR_1 | C: TABLET SALES FLOOR | ✎ |
| 0008 | SALES FLOOR_2 | C: TABLET SALES FLOOR | ✎ |

BUA

FIG. 11

CASH REGISTER MACHINE MASTER    EDIT

ARA

| CASH REGISTER MACHINE CODE | 0001 | ▲ |
|---|---|---|
| CASH REGISTER MACHINE NAME | PERMANENT FACE-TO-FACE SEMI-SELF_1 | |
| PAYMENT SCENE | A: STATIONARY FACE-TO-FACE SEMI ▼ | |
| IOBOX CONNECTION | ● YES          ○ NO | |
| IOBOX ADDRESS | XXX. XXX. XXX. XXX | |
| COIN MACHINE CONNECTION | ● YES          ○ NO | |
| COIN MACHINE MODEL | ● MANUFACTURED  ○ MANUFACTURED<br>BY COMPANY A     BY COMPANY B | |
| SETTLEMENT TERMINAL 1 CONNECTION | ● YES          ○ NO | |
| SETTLEMENT TERMINAL 1 ADDRESS | XXX. XXX. XXX. XXX | |
| SETTLEMENT TERMINAL 2 CONNECTION | ● YES          ○ NO | |
| SETTLEMENT TERMINAL 2 ADDRESS | | |
| SETTLEMENT TERMINAL 3 CONNECTION | ● YES          ○ NO | |
| SETTLEMENT TERMINAL 3 ADDRESS | | |
| PRINTER CONNECTION | ● YES          ○ NO | |
| PRINTER NAME | PRINTER_LANE 1 | |
| SCANNER CONNECTION | ○ YES          ● NO | |
| SCANNER NAME | | ▼ |

| DELETE | | RETURN | SAVE |
|---|---|---|---|

BUB                                                    BUC        BUD

FIG. 13

| FUNCTION SETTINGS FOR EACH SCENE | | | | | | | |
|---|---|---|---|---|---|---|---|
| TOTAL 5 | | | | | | | |
| PAYMENT SCENE | TERMINAL CAMERA SCAN | CASH PAYMENT | IMPRINTER | TRANSFER | | TICKET ISSUE | EDIT |
| A: STATIONARY FACE-TO-FACE SEMI | DISABLE | ENABLE | DISABLE | ENABLE | | ENABLE | ✎ |
| B: TABLET PROVISIONAL | ENABLE | DISABLE | DISABLE | DISABLE | | DISABLE | ✎ |
| C: TABLET SALES FLOOR | ENABLE | DISABLE | DISABLE | DISABLE | | DISABLE | ✎ |
| D: BUSINESS SMARTPHONE | ENABLE | DISABLE | DISABLE | DISABLE | | DISABLE | ✎ |
| E: RELATED-ART FACE-TO-FACE CASH REGISTER | DISABLE | ENABLE | ENABLE | ENABLE | | ENABLE | ✎ |

BUE

FIG. 14

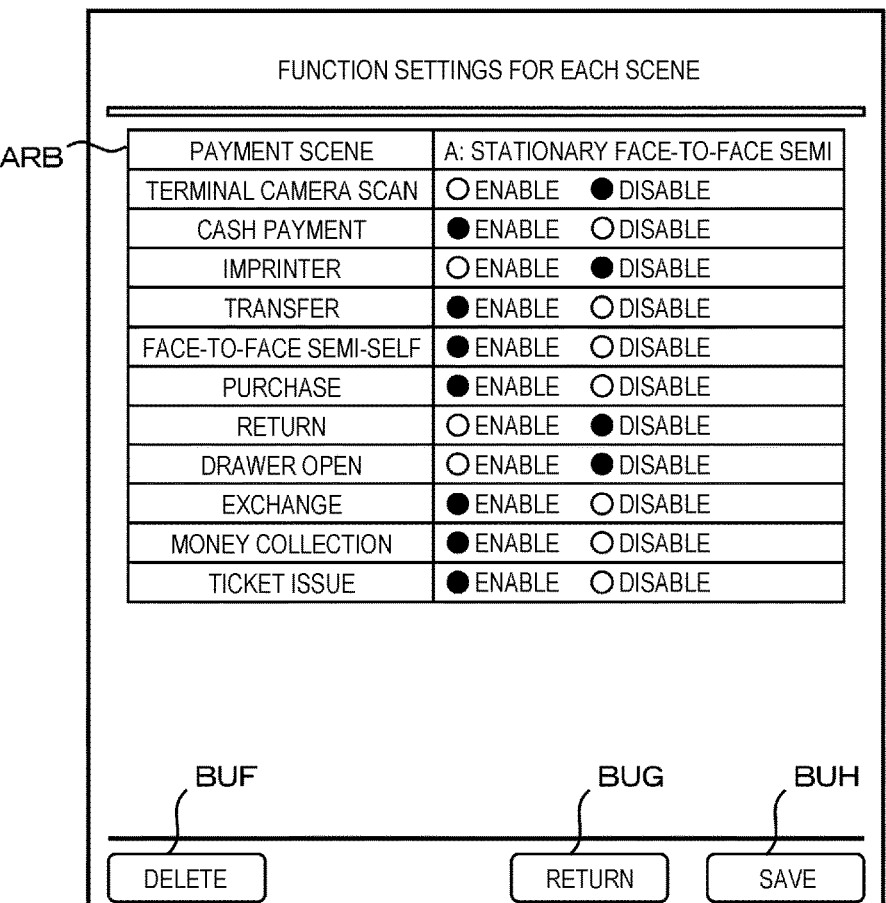

FUNCTION SETTINGS FOR EACH SCENE

ARB

| PAYMENT SCENE | A: STATIONARY FACE-TO-FACE SEMI |
|---|---|
| TERMINAL CAMERA SCAN | ○ ENABLE   ● DISABLE |
| CASH PAYMENT | ● ENABLE   ○ DISABLE |
| IMPRINTER | ○ ENABLE   ● DISABLE |
| TRANSFER | ● ENABLE   ○ DISABLE |
| FACE-TO-FACE SEMI-SELF | ● ENABLE   ○ DISABLE |
| PURCHASE | ● ENABLE   ○ DISABLE |
| RETURN | ○ ENABLE   ● DISABLE |
| DRAWER OPEN | ○ ENABLE   ● DISABLE |
| EXCHANGE | ● ENABLE   ○ DISABLE |
| MONEY COLLECTION | ● ENABLE   ○ DISABLE |
| TICKET ISSUE | ● ENABLE   ○ DISABLE |

BUF      BUG      BUH

DELETE      RETURN      SAVE

SALES TRANSACTION PROCESSING SYSTEM, SALES TRANSACTION PROCESSING APPARATUS, AND METHOD PERFORMED BY SALES TRANSACTION PROCESSING APPARATUS

CROSS-REFERENCE TO RELATED APPLICATION

This application is based upon and claims the benefit of priority from Japanese Patent Application No. 2023-021908, filed on Feb. 15, 2023, the entire contents of which are incorporated herein by reference.

FIELD

Embodiments of the present disclosure relate to a sales transaction processing system, a sales transaction processing apparatus, and a method performed thereby.

BACKGROUND

In a point-of-sale (POS) system, an information terminal device such as a POS terminal for receiving an operation by an operator manages a transaction being processed. Therefore, if such an information terminal device fails in the middle of processing a transaction, an operator needs to start over the operation to complete the transaction.

DESCRIPTION OF THE DRAWINGS

FIG. 4 is a diagram schematically showing a data structure of one data record included in a function restriction table.

FIG. 5 is a diagram schematically showing a data structure of one data record included in a management table.

FIG. 9 is a flowchart showing a cash register machine editing process.

FIG. 10 is a diagram showing an example of a cash register machine list screen.

FIG. 11 is a diagram showing an example of a configuration editing screen.

FIG. 13 is a diagram showing an example of a function setting list screen.

FIG. 14 is a diagram showing an example of a function setting screen.

DETAILED DESCRIPTION

Embodiments of the present disclosure provide a transaction processing apparatus and an information processing method that can continue processing a transaction that is processed in response to an operation using an information terminal device even if the information terminal device fails.

A sales transaction processing system in one embodiment comprises a plurality of terminals installed in a store and configured to register an item for purchase in a sales transaction; a plurality of first devices connectable to the terminals for executing the sales transaction; and a sales transaction processing apparatus including: a communication interface connectable to the terminals and the first devices, a memory that stores first data that associates each of the terminals with one of the first devices, and a processor. The processor is configured to: upon receipt of a notification indicating one of the first devices from a first terminal, update the first data to associate the first terminal with said one of the first devices, upon receipt of a registration request from the first terminal, generate second data for a sales transaction in association with said one of the first devices and store the second data in the memory, and upon receipt of a change request from a second terminal, update the first data to associate the second terminal with said one of the first devices.

Hereinafter, embodiments will be described with reference to the drawings.

Figure 1:
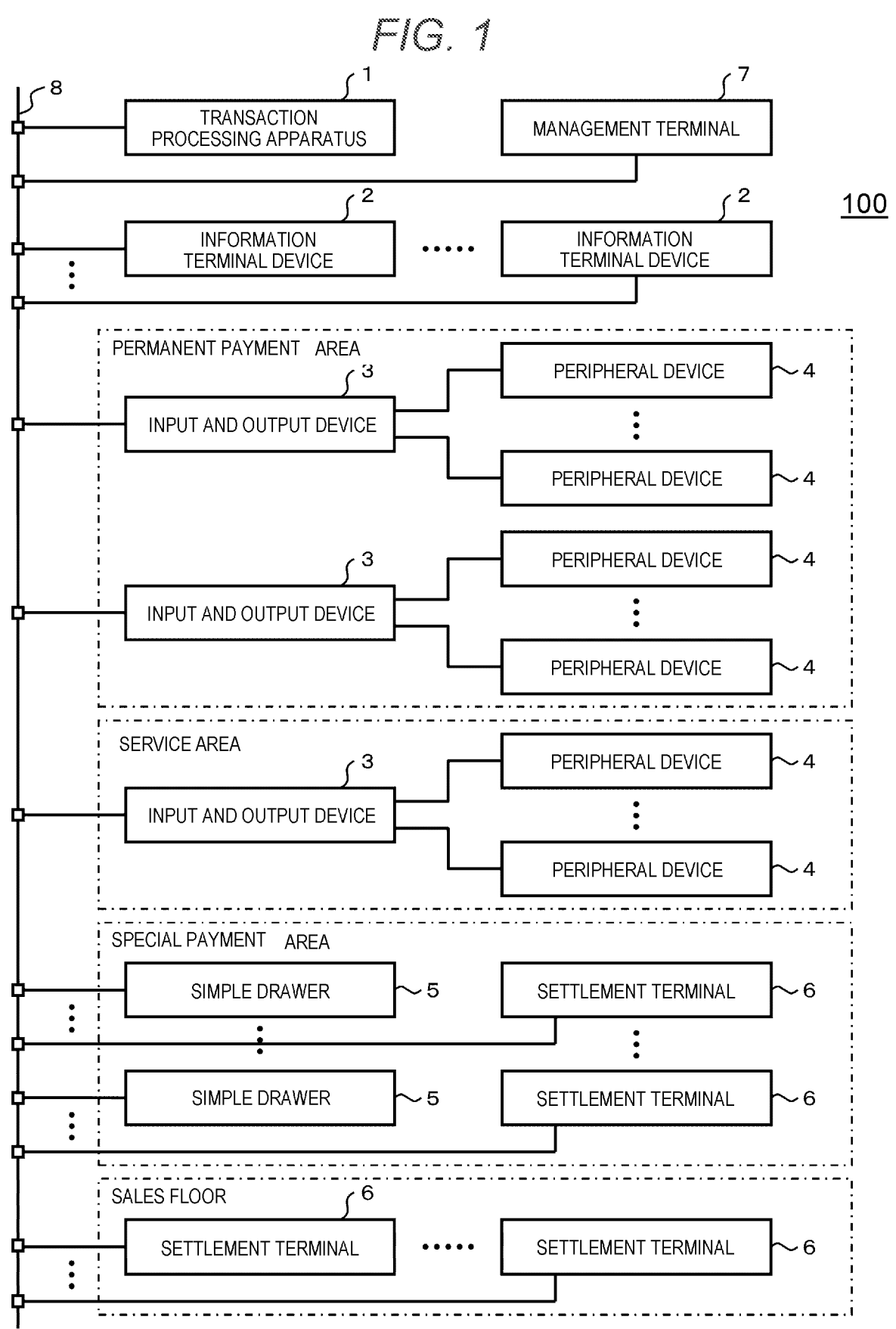
FIG. 1 is a block diagram showing a schematic configuration of a transaction processing system according to an embodiment.

FIG. 1 is a block diagram showing a schematic configuration of a sales transaction processing system 100 (hereinafter simply referred to as a transaction processing system) according to an embodiment.

The configuration of the transaction processing system 100 shown in FIG. 1 is one specific example related to a certain store and adapted to a management policy of the store.

The transaction processing system 100 shown in FIG. 1 includes a transaction processing apparatus 1, an information terminal device 2, an input and output device 3, a peripheral device 4, a cash register drawer 5 ("drawer 5," "mobile drawer 5," or "simple drawer 5"), a settlement terminal 6, a management terminal 7, and a communication network 8. The transaction processing apparatus 1, the information terminal device 2, the input and output device 3, the drawer 5, the settlement terminal 6, and the management terminal 7 can communicate with one another via the communication network 8. Connection of the transaction processing apparatus 1, the information terminal device 2, the input and output device 3, the drawer 5, the settlement terminal 6, and the management terminal 7 to the communication network 8 may be either wired connection or wireless connection. For example, it may be assumed that the connection of the transaction processing apparatus 1, the input and output device 3, and the drawer 5 is a wired connection, and the connection of the information terminal device 2, the settlement terminal 6, and the management terminal 7 is a wireless connection.

The transaction processing apparatus 1 performs an information process for processing a transaction while controlling the peripheral device 4, the drawer 5, and the settlement terminal 6 as appropriate in response to an operation by an operator from the information terminal device 2. The transaction processing apparatus 1 includes an application program for executing a process executed in a related-art POS terminal such as a commodity registration process for registering a commodity to be purchased, a payment process for paying for a registered commodity, or other business processes. The transaction processing apparatus 1 executes various processes related to the transaction in response to the operation by the operator from the information terminal device 2.

The information terminal device 2 is a user interface device for receiving the operation by the operator. As hardware of the information terminal device 2, for example, a tablet computer can be used. The information terminal device 2 includes an application program for providing a user interface for communicating with or controlling the transaction processing apparatus 1, the input and output device 3, and the peripheral device 4 in response to the operation by the operator.

One or more peripheral devices 4 are connected to the input and output device 3 as appropriate. The input and output device 3 performs an interface process for the connected peripheral device 4 to perform communication via the communication network 8. The input and output device 3 functions as a peripheral device control device that controls connection of the transaction processing apparatus 1 and the information terminal device 2 to the peripheral device 4. Alternatively, the input and output device 3 can be also referred to as a device that mediates the connection of the transaction processing apparatus 1 and the information terminal device 2 to the peripheral device 4. In the present embodiment, the input and output device 3 may be referred to as an "IO BOX".

The devices of the transaction processing system 100 shown in FIG. 1 are installed at various locations including as a permanent payment area, a service counter, a special payment area, and a sales floor in a store. In other words, those devices are installed in accordance with various payment scenes such as a permanent payment area, a service counter, a special payment area, and a sales floor. The transaction processing system 100 in FIG. 1 is adapted to a management policy of the store. In this context, the permanent payment area refers to a location that is permanently designated in the store for general payment (e.g., a checkout section). At the permanent payment area, devices necessary for performing payment processing are installed. The service counter is located at a place in the store different from the permanent payment area and refers to a location where various additional services can be provided other than general payment. For example, devices necessary for providing services such as member registration and a delivery request are provided at the service counter. The devices at the service counter can also be used for performing a payment process and a merchandise return process. The special payment area refers to a location that is not generally used but is temporarily open during busy times or for special events for receiving payments. At the special payment area, devices for temporarily performing payment processing are provided. In this context, the sales floor refers to a location where merchandise, commodities and the like are displayed (either permanently or temporarily) and customers can look at the merchandise, commodities, etc. before purchase. In general, the system of the devices at the permanent payment area is simpler than the systems of the devices at the service counter and the special payment area. A device on the sales floor may be a mobile device that can be carried by a store clerk, for example.

The peripheral device 4 is a device that performs various processes related to a transaction process. As the peripheral device 4, various types of devices such as an automatic coin machine, a drawer, a settlement terminal, a printer, a scanner, or a display can be used as appropriate. Many of the peripheral devices 4 are integrated into POS terminals or externally attached to POS terminals.

In the transaction processing system 100 shown in FIG. 1, one input and output device 3 is installed corresponding to a checkout lane in the permanent payment area provided in the store, and the peripheral devices 4 used for processing transactions in the same checkout lane are connected to the input and output device 3. Thus, FIG. 1 shows a case where two checkout lanes are set in the permanent payment area. In the transaction processing system 100 shown in FIG. 1, one input and output device 3 is installed in the service counter provided in the store, and the peripheral devices 4 used for processing transactions in the service counter are connected to the input and output device 3.

The drawer 5 has a simple configuration so as to be easily movable. That is, the drawer 5 can be mobile and moved place to place as required. In the transaction processing system 100 shown in FIG. 1, the drawer 5 is used in a special payment area that may be temporarily provided in the store.

The settlement terminal 6 is a terminal device that performs a process for settlement or checkout by various settlement methods. The settlement terminal 6 may support only one settlement method or may support a plurality of settlement methods. Each of a plurality of settlement terminals 6 may support various settlement methods. Examples of the settlement methods supported by the settlement terminal 6 include credit card settlement, electronic money settlement, code settlement, prepaid settlement, debit settlement, and cash voucher settlement. In the transaction processing system 100 shown in FIG. 1, the settlement terminal 6 is used in the special payment area and the sales floor.

The management terminal 7 is an information processing device functioning as a user interface for receiving an operation from an administrator of the transaction processing system shown in FIG. 1. As hardware of the management terminal 7, an information processing device such as a tablet computer, a desktop computer, or a laptop computer can be used.

The Internet, a virtual private network (VPN), a local area network (LAN), a public communication network, a mobile communication network, and the like can be used alone or in combination as appropriate as the communication network 8. As an example, a LAN is used as the communication network 8. Alternatively, an appropriate modification can be made, such as a form in which, for example, a combination of a LAN and the Internet is used as the communication network 8 and communication between the transaction processing apparatus 1 and another device is performed via the Internet. Thus, the communication network 8 may include a network device such as a router and a transmission cable.

Figure 2:
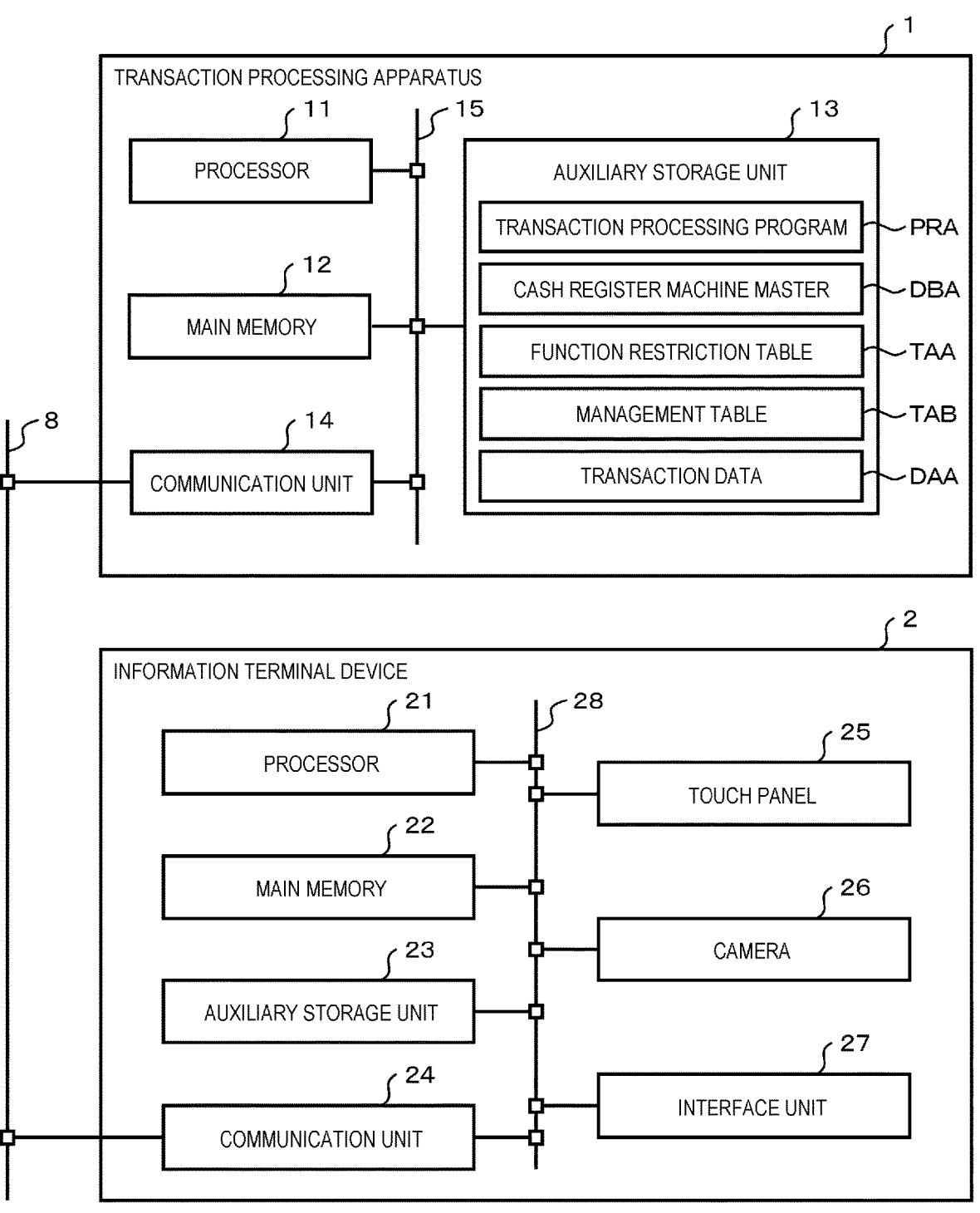
FIG. 2 is a hardware block diagram of a transaction processing apparatus and an information terminal device.

FIG. 2 is a hardware block diagram of the transaction processing apparatus 1 and the information terminal device 2. The transaction processing apparatus 1 includes a processor 11, a main memory 12, an auxiliary storage unit 13, a communication unit 14, a transmission path 15, and the like. The processor 11, the main memory 12, the auxiliary storage unit 13, and the communication unit 14 can communicate with one another via the transmission path 15.

The processor 11, the main memory 12, and the auxiliary storage unit 13 connected to each other via the transmission path 15 constitute a controller that performs an information process for controlling the transaction processing apparatus 1.

The processor 11 corresponds to a core component of the above-described controller. The processor 11 executes an information process for controlling each unit of the transaction processing apparatus 1 to perform various functions thereof according to an operating system and information processing programs such as application programs.

The main memory 12 includes a read-only memory area and a rewritable memory area. The read-only memory area of the main memory 12 stores a part of the above-described information processing programs. In addition, the read-only memory area or the rewritable memory area of the main memory 12 may store data necessary for the processor 11 to execute a process for controlling each unit of the transaction processing apparatus 1. The rewritable memory area of the main memory 12 is also used as a work area for the processor 11.

As the auxiliary storage unit 13, for example, an electric erasable programmable read-only memory (EEPROM), a hard disc drive (HDD), a solid state drive (SSD), or other various well-known storage devices may be used. The auxiliary storage unit 13 stores data used for the processor 11 to perform various processes and data generated by the processor 11. The auxiliary storage unit 13 may store the above-described information processing programs. In the present embodiment, the auxiliary storage unit 13 stores a transaction processing program PRA, which is one of the information processing programs. The transaction processing program PRA is an application program for executing a transaction process related to commodity sale at a store, which will be described later. A part of a storage area of the auxiliary storage unit 13 is used as an area for storing a cash register machine master database DBA, a function restriction table TAA, a management table TAB, and transaction data DAA.

The cash register machine master database DBA is a database for storing a configuration of each of cash register systems or machines (hereinafter simply referred to as cash register machines). Here, each cash register machine is a set of devices used when the transaction processing apparatus processes one transaction. For example, in the transaction processing system 100 shown in FIG. 1, a set of one information terminal device 2, one input and output device 3, and the peripheral devices 4 connected to the input and output device 3 constitutes one cash register machine at the permanent payment area and the service counter. For example, in the transaction processing system 100 shown in FIG. 1, one information terminal device 2, one drawer 5, and one settlement terminal 6 are used to constitute one cash register machine for the special payment area. For example, in the transaction processing system 100 shown in FIG. 1, one information terminal device 2 and one settlement terminal 6 are used to constitute one cash register machine for the sales floor. In FIG. 1, the information terminal device 2 is shown as not belonging to any of the permanent payment area, the service counter, the special payment area, and the sales floor. However, in an actual operation, the information terminal device 2 may be brought into any of the permanent payment area, the service counter, the special payment area, and the sales floor and used.

The function restriction table TAA is a data table representing, for each scene in which the cash register machine is used (hereinafter referred to as a payment scene), which function is permitted to be executed among a part of a plurality of functions that can be executed during the transaction process.

The management table TAB is a data table for associating a cash register machine with an information terminal device 2.

The transaction data DAA is data representing a content of one transaction.

The communication unit 14 is a network interface circuit that executes a communication process for performing data communication via the communication network 8. As the communication unit 14, for example, a communication device for a LAN can be used.

The transmission path 15 includes an address bus, a data bus, a control signal line, and the like, and transmits data and control signals exchanged between the connected units.

The information process executed by the transaction processing apparatus 1 is a process for processing a transaction in response to an operation on the information terminal device 2, as will be described later. Therefore, the transaction processing apparatus 1 operates as a server apparatus with the information terminal device 2 as a client. If only a LAN is used as the communication network 8, the transaction processing apparatus 1 operates in the form of a local server. If, for example, a LAN and the Internet are used in combination as the communication network 8 and the communication between the transaction processing apparatus 1 and another device is performed via the Internet, the transaction processing apparatus 1 operates in the form of a web server or a cloud server.

The information terminal device 2 includes a processor 21, a main memory 22, an auxiliary storage unit 23, a communication unit 24, a touch panel 25, a camera 26, an interface unit 27, a transmission path 28, and the like. The processor 21, the main memory 22, the auxiliary storage unit 23, the communication unit 24, the touch panel 25, the camera 26, and the interface unit 27 can communicate with one another via the transmission path 28.

The processor 21, the main memory 22, and the auxiliary storage unit 23 connected to each other via the transmission path 28 constitute a controller that performs an information process for controlling the information terminal device 2.

The processor 21 corresponds to a core component of the above-described controller. The processor 21 executes an information process for controlling each unit of the information terminal device 2 to perform various functions thereof according to an operating system and information processing programs such as application programs.

The main memory 22 includes a read-only memory area and a rewritable memory area. The read-only memory area of the main memory 22 stores a part of the above-described information processing programs. In addition, the read-only memory area or the rewritable memory area of the main memory 22 may store data necessary for the processor 21 to execute a process for controlling each unit of the information terminal device 2. The rewritable memory area of the main memory 22 is also used as a work area for the processor 21.

As the auxiliary storage unit 23, for example, an EEPROM, an HDD, an SSD, or other various well-known storage devices may be used. The auxiliary storage unit 23 stores data used for the processor 21 to perform various processes and data generated by the processor 21. The auxiliary storage unit 23 may store the above-described information processing programs.

The communication unit 24 is a network interface circuit that executes a communication process for performing data communication via the communication network 8. As the communication unit 24, for example, a communication device for a LAN can be used.

The touch panel 25 includes a display screen on which various information related to a transaction can be displayed. The camera 26 captures an image of a barcode attached to a commodity. The interface unit 27 is an interface circuit connectable to an external device.

The transmission path 28 includes an address bus, a data bus, a control signal line, and the like, and transmits data and control signals exchanged between the connected units.

Figure 3:
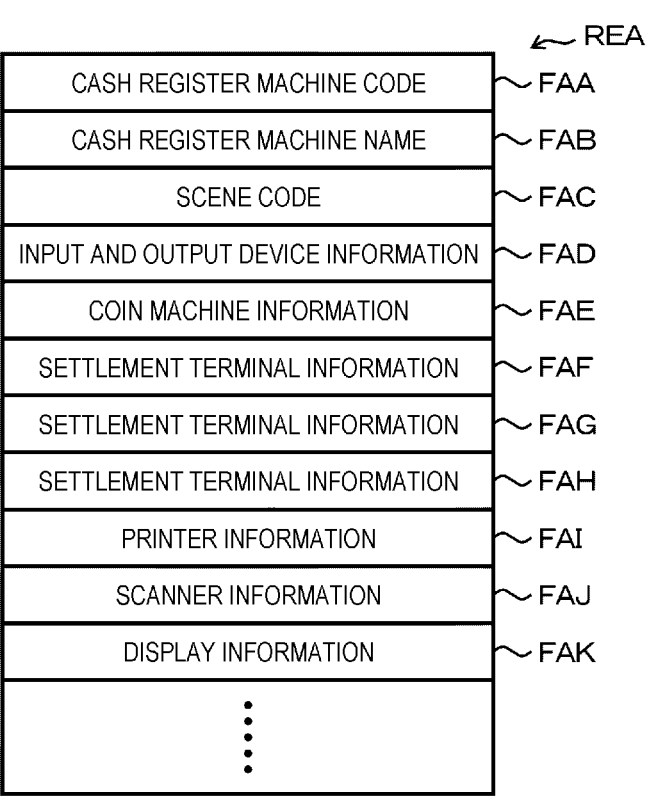
FIG. 3 is a diagram schematically showing a data structure of one data record included in a cash register machine master database (DB).

FIG. 3 is a diagram schematically showing a data structure of one data record REA included in the cash register machine master database DBA.

The cash register machine master database DBA is a set of a plurality of data records REA correlated with each of cash register machines included in the transaction processing system 100. The data record REA includes a plurality of fields FAA, FAB, . . . . The field FAA stores a cash register machine code as an identifier of the correlated cash register machine. The field FAB stores a name of the correlated cash register machine. The field FAC stores a scene code as an identifier of a usage scene of the correlated cash register machine. The field FAC may store the scene code and a name of a payment scene thereof. The field FAD and subsequent fields store information on the input and output devices 3 related to various devices other than the information terminal device 2 belonging to the correlated cash register machine.

The cash register machine master database DBA is generated, for example, in an operation of installing the transaction processing system 100 by, for example, an operator thereof. The cash register machine master database DBA may be updated by a maintenance operation in the case of changing the configuration of the transaction processing system 100 or the like, but is not updated in the transaction process to be described later.

As an example, one of the cash register machines installed in the permanent payment area is constituted by an automatic coin machine, a settlement terminal, a printer, a scanner, and a display as the peripheral devices 4 connected to the input and output device 3, "0001" and "permanent face-to-face semi-self_1" are set as the cash register machine code and name, respectively, and the scene code of the assigned payment scene is "A". In this case, the fields FAA, FAB, and FAC in the data record REA correlated with the cash register machine are set with "0001", "permanent face-to-face semi-self_1", and "A", respectively, and the fields FAD, FAE, FAF, FAI, FAJ, and FAK store information on the above-described input and output device 3, automatic coin machine, settlement terminal, printer, scanner, and display, respectively. Fields for which there is no corresponding device, such as the fields FAG and FAH in the case of this example, may be left blank or may store a predetermined null value.

As another example, one of the cash register machines installed in the special payment area includes the drawer 5 and the settlement terminal 6, "0005" and "provisional cash register_2" are set as the cash register machine code and name, respectively, and the scene code of the assigned payment scene is "B". In this case, the fields FAA, FAB, and FAC in the data record REA correlated with the cash register machine store "0005", "provisional cash register_2", and "B", respectively, and the fields FAE and FAF store information on the above-described drawer 5 and settlement terminal 6, respectively.

As another example, one of the cash register machines used in the sales floor includes three settlement terminals 6, "0007" and "sales floor_2" are set as the cash register machine code and name, and the scene code of the assigned payment scene is "C". In this case, the fields FAA, FAB, and FAC in the data record REA correlated with the cash register machine store "0007", "sales floor_2", and "C", respectively, and the fields FAF, FAG, and FAH store information on the above-described three settlement terminals 6, respectively.

FIG. 4 is a diagram schematically showing a data structure of one data record REB included in the function restriction table TAA.

The function restriction table TAA is a set of a plurality of data records REB respectively correlated with a plurality of predetermined payment scenes. The plurality of payment scenes are determined as appropriate by an administrator of the transaction processing system or the like according to a management policy of each store, such as in what kind of scene the cash register machine is used. The data record REB includes fields FBA, FBB, . . . . The field FBA stores a scene code of the correlated payment scene. The field FBB stores a name of the correlated payment scene. The field FBC and subsequent fields store flags representing whether executions of various functions implemented by the transaction process are permitted. In other words, in the field FBC and the subsequent fields, setting information for enabling or disabling various functions is generated or edited for each payment scene distinguished by the scene code.

As an example, when each of functions called "terminal camera scan", "cash payment", "imprinter", "transfer", "face-to-face semi-self", "purchase", "return", "drawer open", "exchange", "money collection", and "ticket issue" is predetermined as a target to be restricted, if "disable", "enable", "disable", "enable", "enable", "enable", "disable", "disable", "enable", "enable", and "enable" are set for functions of a payment scene with the scene code "A" and a name "stationary face-to-face semi", the field FBA stores "A" and flags set in the fields FBB to FBL represent "disable", "enable", "disable", "enable", "enable", "enable", "disable", "disable", "enable", "enable", and "enable", respectively.

The function restriction table TAA is generated, for example, in an operation of installing the transaction processing system 100 by, for example, an operator thereof in accordance with an operation policy of the transaction processing system 100. The function restriction table TAA may be updated as described later in response to an instruction from an administrator of the transaction processing system 100 or the like, but is not updated in the transaction process to be described later.

The "terminal camera scan" is a function of acquiring a commodity barcode or the like with a camera 26 provided in the information terminal device 2. The "cash payment" is a function for payment registration in cash. In a case of using this function, as an example, a store clerk selects a "cash" button from a payment method selection button on a payment screen, uses a numeric keypad to enter a deposit, and executes cash settlement. The "imprinter" is a function of printing a credit card company and a payment category on a receipt. The "transfer" is a function of enabling transfer. The "face-to-face semi-self" is a function of enabling a semi-self-service-type operation in which a guide is displayed on a screen on a customer side, registration is performed in response to a store clerk operation, and settlement is performed in response to a customer operation. The "purchase" is a function of executing a process related to purchase of second-hand commodities or the like. The "return" is a function of executing a process for receiving a returned commodity. The "drawer open" is a function of opening and closing a drawer belonging to the same cash register machine. The "exchange" is a function of executing a process for exchange. The "money collection" is a function of enabling collection of money stored in an automatic coin machine by denomination. The "ticket issue" is a function of printing a ticket with a ticket printer provided in the cash register machine in a case of selling a ticket, such as a lift ticket.

FIG. 5 is a diagram schematically showing a data structure of one data record REC included in the management table TAB.

The management table TAB is a set of a plurality of data records REC correlated with each of the cash register machines included in the transaction processing system 100. The data record REC includes fields FCA, FCB, and FCC. The field FCA stores a cash register machine code of the correlated cash register machine. The field FCB stores data representing a state of the correlated cash register machine. The data selectively represents, for example, whether the correlated cash register machine is in use or unused. The field FCC stores a terminal device code as an identifier of the information terminal device 2 used in the correlated cash register machine.

The management table TAB is updated as described later during the transaction process, which will be described later.

Figure 6:
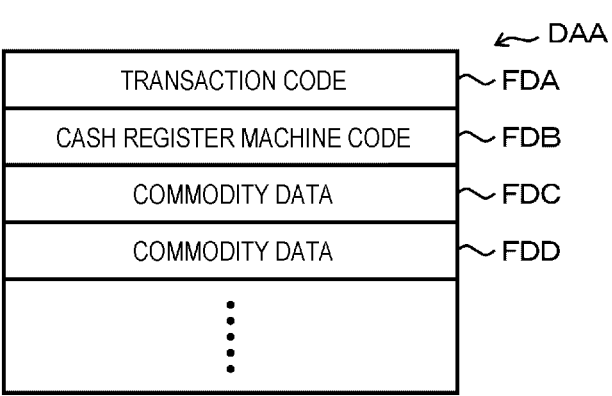
FIG. 6 is a diagram schematically showing a data structure of transaction data.

FIG. 6 is a diagram schematically showing a data structure of transaction data DAA.

The transaction data DAA is generated for each transaction being processed in the transaction processing apparatus 1 and is stored in the auxiliary storage unit 13. Thus, no transaction data DAA may be stored in the auxiliary storage unit 13, or a plurality of pieces of transaction data DAA may be simultaneously stored in the auxiliary storage unit 13 for each of a plurality of transactions being processed.

The transaction data DAA includes fields FDA and FDB. The transaction data DAA may include any number of fields after a field FDC. The field FDA stores a transaction code as an identifier of the corresponding transaction. The field FDB stores a cash register machine code for a cash register machine used for the corresponding transaction. If there are registered commodities as commodities to be traded (hereinafter, referred to as transaction commodities), the fields FDC, FDD, . . . , which are correlated with the respective transaction commodities, are added to the transaction data DAA. Each of the fields FDC, FDD, . . . stores commodity data for a separate transaction commodity. The commodity data includes a commodity code as an identifier and a quantity of the corresponding transaction commodity. The commodity data may include other various types of information such as a commodity name, a unit price, and discount information.

The transaction data DAA is generated and updated as appropriate in the transaction process to be described later.

As hardware of the transaction processing apparatus 1, for example, a server apparatus can be used. Transfer of the transaction processing apparatus 1 is generally performed in a state in which the transaction processing program PRA is stored in the auxiliary storage unit 13. However, hardware in a state in which the transaction processing program PRA is not stored in the auxiliary storage unit 13 or in a state in which an application program with the same type as the PRA and a different version from the PRA is stored in the auxiliary storage unit 13 and the transaction processing program PRA may be individually transferred. The transaction processing apparatus 1 may be set up by writing the transaction processing program PRA in the auxiliary storage unit 13 in response to an operation of any operator. Transfer of the transaction processing program PRA can be performed by recording the transaction processing program PRA in a non-transitory computer readable recording medium such as a magnetic disk, a magneto-optical disk, an optical disk, or a semiconductor memory, or by communication via a network.

Next, an operation of the transaction processing system 100 configured as described above will be described mainly on an operation of the transaction processing apparatus 1. A content of a process to be described below is merely an example, and it is possible to appropriately change an order of some of the processes, omit some of the processes, and add another process. In addition, for a specific process described below, another process that provides similar results may be applied.

(Transaction Process)

Figure 7:
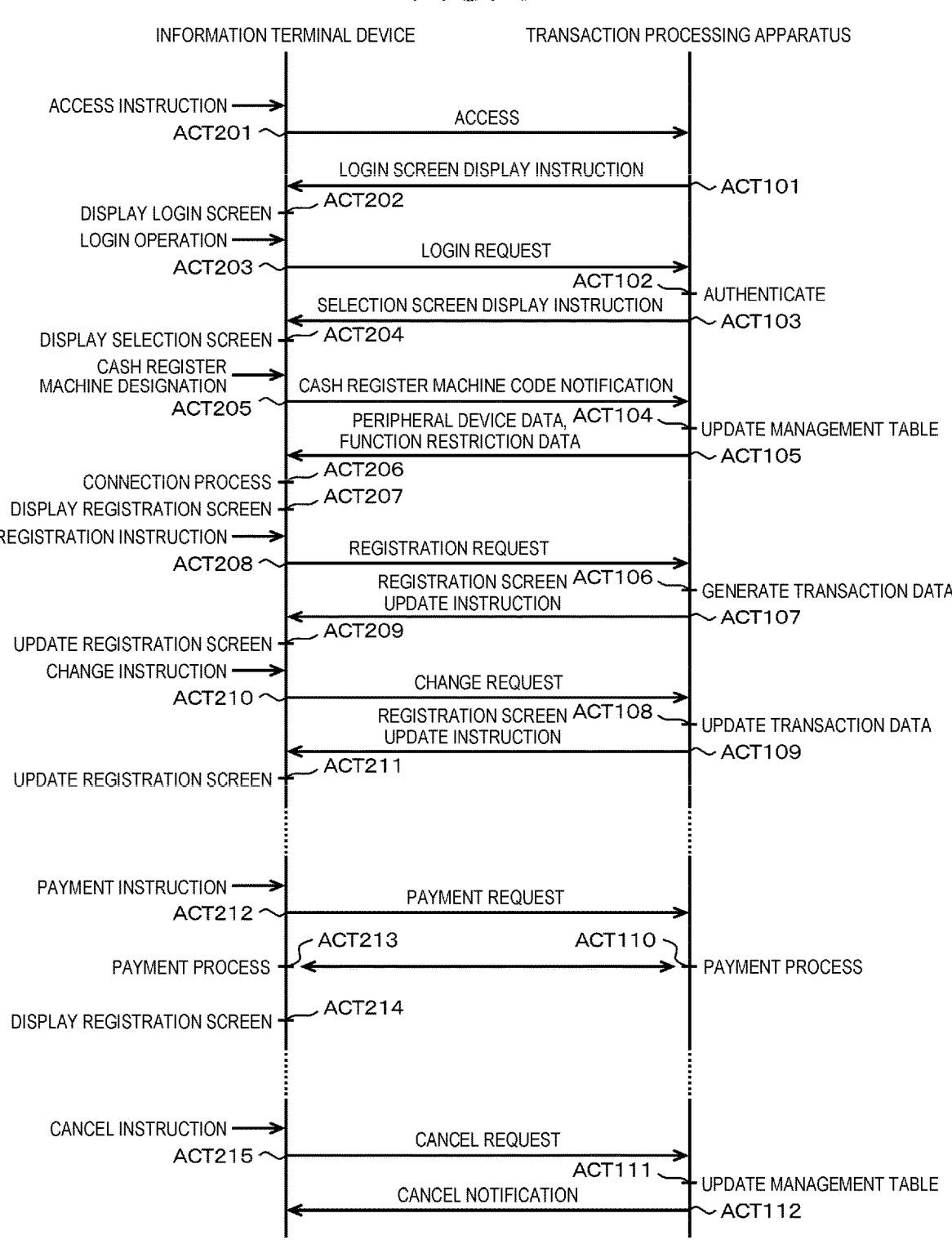
FIG. 7 is a sequence diagram showing an example of a procedure for the transaction processing apparatus to process a transaction using one information terminal device as a user interface.

FIG. 7 is a sequence diagram showing an example of a procedure for the transaction processing apparatus 1 to process a transaction using one information terminal device 2 as a user interface.

A store clerk activates one information terminal device 2 that is not in use when starting to use an unused cash register machine. Then, an access to the transaction processing apparatus 1 is instructed by a predetermined operation. Upon receiving the access instruction, the information terminal device 2 proceeds to ACT 201. All operations of the information terminal device 2 described below are performed by the processor 21 of the information terminal device 2.

As ACT 201, the information terminal device 2 accesses the transaction processing apparatus 1 via the communication network 8.

When receiving the above-described access from the information terminal device 2, the processor 11 of the transaction processing apparatus 1 starts an information process based on the transaction processing program PRA (hereinafter, referred to as a transaction process). All operations of the transaction processing apparatus 1 described below are performed by the transaction process.

As ACT 101, the transaction processing apparatus 1 instructs the information terminal device 2 to display a login screen.

As ACT 202, the information terminal device 2 causes, for example, the touch panel 25 to display the login screen in response to the above-described instruction. The login screen is a screen for allowing the operator to input information for operator authentication. The store clerk performs a predetermined login operation for inputting predetermined authentication information for operator authentication to the information terminal device 2. Upon receiving the login operation, the information terminal device 2 proceeds to ACT 203.

As ACT 203, the information terminal device 2 requests the transaction processing apparatus 1 to log in along with a notification of the input authentication information. Upon receiving the request, the transaction processing apparatus 1 proceeds to ACT 102.

As ACT 102, the transaction processing apparatus 1 authenticates that the operator of the information terminal device 2 is a store clerk who has a use authority of the information terminal device 2 based on the notified authentication information. If the authentication is successful, the transaction processing apparatus 1 proceeds to ACT 103.

As ACT 103, the transaction processing apparatus 1 instructs the information terminal device 2 to display a selection screen. Upon receiving the instruction, the information terminal device 2 proceeds to ACT 204.

As ACT 204, the information terminal device 2 causes, for example, the touch panel 25 to display the selection screen in response to the above-described instruction. The selection screen is a screen for allowing the store clerk to select a cash register machine to which the information terminal device 2 is applied. The transaction processing apparatus 1 displays, for example, a list of cash register machines correlated with the data records included in the cash register machine master database DBA on the selection screen as a screen for receiving designation of one of the cash register machines.

The store clerk determines a cash register machine to which the information terminal device 2 is applied, and performs a predetermined operation for designating the cash register machine on the information terminal device 2. In response to the operation, the information terminal device 2 proceeds to ACT 205.

As ACT 205, the information terminal device 2 notifies the transaction processing apparatus 1 of a cash register machine code of the cash register machine designated as described above. Upon receiving the notification, the transaction processing apparatus 1 proceeds to ACT 104.

As ACT 104, the transaction processing apparatus 1 updates the management table TAB so as to correlate the information terminal device 2 with the cash register machine designated as described above. At this time, for example, the processor 11 of the transaction processing apparatus 1 searches the management table TAB for the data record REC in which the notified cash register machine code is set in the field FCA. For example, if the data set in the field FCB of the corresponding data record REC represents "unused", the processor 11 rewrites the data to data representing "in use", and sets the terminal device code of the information terminal device 2 in the field FCC.

Thus, the transaction processing apparatus 1 manages a correlation between the information terminal device and the cash register machine code using the management table TAB. That is, the processor 11 executes the information process based on the transaction processing program PRA, so that the processor 11 functions as a terminal management unit.

As ACT 105, the transaction processing apparatus 1 transmits peripheral device data and function restriction data related to various devices belonging to the cash register machine designated as described above to the information terminal device 2.

The peripheral device data includes at least connection information for communicating with each device. The peripheral device data includes various types of data necessary for using the device in the transaction process, such as data representing each device type, a device name, or what functions are provided. For example, the transaction processing apparatus 1 searches the cash register machine master database DBA for the data record REA in which the notified cash register machine code is set in the field FAA. For example, the transaction processing apparatus 1 acquires predetermined information from information set in the field FAD and subsequent fields in the corresponding data record REA to generate connection information. The transaction processing apparatus 1 transmits the peripheral device data including the generated connection information to the information terminal device 2.

The function restriction data is data representing function restriction settings related to a payment scene of the designated cash register machine. For example, the transaction processing apparatus 1 refers to the cash register machine master database DBA to determine a scene code of the payment scene of the cash register machine designated as described above. Then, for example, the transaction processing apparatus 1 searches the function restriction table TAA for the data record REB in which the corresponding scene code is set in the field FBA. Further, for example, the transaction processing apparatus 1 generates the function restriction data as data including the corresponding data record REB as it is. The transaction processing apparatus 1 transmits the generated function restriction data to the information terminal device 2. Upon receiving the peripheral device data and the function restriction data, the information terminal device 2 proceeds to ACT 206.

As ACT 206, the information terminal device 2 performs a connection process for enabling communication with various devices using the peripheral device data.

As ACT 207, the information terminal device 2 causes, for example, the touch panel 25 to display a registration screen. The registration screen is a screen for causing the store clerk to confirm a registration state of a transaction commodity. That is, the registration screen displays, for example, a list of transaction commodities. The registration screen is a screen for registering a transaction commodity. Since no transaction commodity is registered here yet, the registration screen does not display any information.

If a customer requests registration of the transaction commodity, the store clerk performs, on the information terminal device 2, a predetermined operation for instructing registration of one of commodities which the customer wants to purchase as a transaction commodity. Here, the operation performed by the store clerk is, for example, an operation for scanning a barcode displayed on the commodity using a scanner provided as the peripheral device 4 or the camera 26 provided in the information terminal device 2. If the terminal camera scan function is disabled based on the received function restriction data as described above, the information terminal device 2 does not perform barcode scan using the camera 26 provided in the information terminal device 2. The operation performed by the store clerk may be, for example, an operation of directly inputting a commodity code or an operation of selecting a preset key of a commodity that is set in advance and that indicates the commodity. Here, the operation performed by the store clerk may be, for example, other various operations performed in an existing POS system. In response to the operation, the information terminal device 2 acquires the commodity code for identifying the commodity, and proceeds to ACT 208.

As ACT 208, the information terminal device 2 requests the transaction processing apparatus 1 to register the commodity along with a notification of the commodity code of the designated commodity. Upon receiving the request, the transaction processing apparatus 1 proceeds to ACT 106.

As ACT 106, the transaction processing apparatus 1 generates new transaction data DAA. That is, for example, the processor 11 of the transaction processing apparatus 1 determines a new transaction code different from the transaction code for identifying another transaction according to a predetermined rule, sets the transaction code in the field FDA, sets a cash register machine code correlated with the information terminal device 2 in the field FDB, generates the transaction data DAA in which the notified commodity code is set in the field FDC, and stores the transaction data DAA in the auxiliary storage unit 13.

As ACT 107, the transaction processing apparatus 1 instructs the information terminal device 2 to update the registration screen. That is, the transaction processing apparatus 1 instructs to update the registration screen so as to list the transaction commodity registered as described above. Specifically, for example, the transaction processing apparatus 1 transmits instruction data for instructing the update to the information terminal device 2. The transaction processing apparatus 1 includes the transaction data DAA generated as described above in the instruction data. Upon receiving the instruction, the information terminal device 2 proceeds to ACT 209.

As ACT 209, the information terminal device 2 updates the registration screen in response to the above-described instruction. Specifically, for example, the information terminal device 2 updates the registration screen such that information on a commodity name included in each piece of commodity data set in the field FDC and subsequent fields in the transaction data DAA included in the above-described instruction data, or the like is displayed in the list of the transaction commodities.

The transaction processing apparatus 1 may include, in the instruction data, only each piece of commodity data among the information included in the transaction data DAA.

The transaction processing apparatus 1 may include, in the instruction data, information such as a uniform resource locator (URL) for displaying the transaction data DAA from the information terminal device 2 without including the transaction data DAA or the commodity data in the instruction data. In this case, the information terminal device 2 updates the registration screen after displaying the transaction data DAA based on the information.

The transaction processing apparatus 1 may generate, based on the updated transaction data DAA, screen data representing the registration screen displaying the list of the transaction commodities, and include the screen data in the instruction data or include information such as a URL for displaying the screen data in the instruction data. In this case, the information terminal device 2 causes the touch panel 25 to display the registration screen represented by the screen data included in the instruction data, or causes the touch panel 25 to display the registration screen that can be displayed from the transaction processing apparatus 1 for an access based on the information such as a URL included in the instruction data.

Thereafter, the store clerk performs a predetermined operation for instructing a change of the transaction commodity on the information terminal device 2 so as to set all commodities to be purchased by the customer as the transaction commodities. The change of the transaction commodity includes addition, that is, registration of a new commodity, deletion, change of points, and the like of a transaction commodity. Here, the operation performed by the store clerk may be the same as the operation performed in the existing POS system, for example. Upon receiving the change instruction, the information terminal device 2 proceeds to ACT 210.

As ACT 210, the information terminal device 2 requests the transaction processing apparatus 1 to change the transaction commodity in response to the above-described operation. Upon receiving the request, the transaction processing apparatus 1 proceeds to ACT 108.

As ACT 108, the transaction processing apparatus 1 updates the transaction data DAA generated in ACT 107 in response to the above-described change request.

As ACT 109, the transaction processing apparatus 1 instructs the information terminal device 2 to update the registration screen. That is, the transaction processing apparatus 1 instructs to update the registration screen so as to list the transaction commodity registered in the transaction data DAA updated as described above, in the same manner as in ACT 107. Upon receiving the instruction, the information terminal device 2 proceeds to ACT 211.

As ACT 211, the information terminal device 2 updates the registration screen in response to the above-described instruction, in the same manner as in ACT 207.

Thereafter, if the store clerk repeats the operation for the change instruction, the transaction processing apparatus 1 and the information terminal device 2 repeat the process same as ACT 210, ACT 108, ACT 109, and ACT 211.

If the store clerk finishes registering all the commodities to be purchased by the customer as the transaction commodities, the store clerk performs a predetermined operation for instructing to perform a payment process on the information terminal device 2. For example, the store clerk operates a subtotal key or a payment method selection key on the information terminal device 2. The payment method selection key may be selected after the subtotal key is selected, or the operation of the subtotal key may not be operated. The subtotal key or the payment method selection key is an operation key for completing the registration of the transaction commodity. The payment method selection key is an operation key for declaring execution of a payment process according to the selected payment method. The payment method indicated by the payment method selection key may include a settlement method supported by the settlement terminal 6 in addition to cash settlement. In response to the instruction, the information terminal device 2 proceeds to ACT 212.

As ACT 212, the information terminal device 2 requests the transaction processing apparatus 1 to perform the payment process. Upon receiving the request, the transaction processing apparatus 1 proceeds to ACT 110.

The transaction processing apparatus 1 in ACT 110 and the information terminal device 2 in ACT 213 cooperate with each other to settle a price for the transaction commodity and execute the payment process for settling the price. The payment process is executed using the payment method designated by the information terminal device 2. The payment process includes, for example, cash settlement for settling a price using a cash machine or the like. The payment process includes, for example, a process for settling a price using a settlement terminal. Details of the payment process may be the same as those performed by an existing POS terminal, for example.

If the payment process is completed, the information terminal device 2 proceeds to ACT 214.

As ACT 214, the information terminal device 2 causes, for example, the touch panel 25 to display a new registration screen not including the information on the transaction commodity. The information terminal device 2 may display a registration screen in response to an instruction from the transaction processing apparatus 1. Thereafter, if a store clerk operation related to a new transaction is performed on the information terminal device 2, the transaction processing apparatus 1 and the information terminal device 2 repeat the process in ACT 106 and ACT 208 and subsequent processes as described above, and processes the new transaction.

As described above, the processor 11 of the transaction processing apparatus 1 processes a transaction to be processed this time as a transaction related to a cash register machine code correlated with the information terminal device 2. That is, the processor 11 executes the information process based on the transaction processing program PRA, so that the processor 11 functions as a transaction processing unit.

If history data related to the transaction processed by the transaction processing apparatus 1 is generated by the transaction processing apparatus 1, it is preferable that the cash register machine code is included in the history data such that the cash register machine used in each transaction can be identified. If history data is generated by an information processing device different from the transaction processing apparatus 1, it is preferable that the transaction processing apparatus 1 includes the cash register machine code in data for notifying the above-described information processing device of a result of the transaction so as to enable the cash register machine code to be included in the history data.

If it is necessary to finish the use of the information terminal device 2 in the current cash register machine for some reason, the store clerk performs a predetermined operation for instructing to cancel the correlation on the information terminal device 2. In response to the instruction, the information terminal device 2 proceeds to ACT 215.

As ACT 215, the information terminal device 2 requests the transaction processing apparatus 1 to cancel the correlation. Upon receiving the request, the transaction processing apparatus 1 proceeds to ACT 111.

As ACT 111, the transaction processing apparatus 1 updates the management table TAB to cancel the correlation related to the information terminal device 2. At this time, for example, the processor 11 of the transaction processing apparatus 1 searches the management table TAB for the data record REC in which the terminal device code of the information terminal device 2 requesting cancel is set in the field FCC. Then, for example, the processor 11 rewrites the data set in the field FCB in the corresponding data record REC to data representing "unused" and deletes the terminal device code set in the field FCC.

As ACT 112, the transaction processing apparatus 1 notifies the information terminal device 2 that the correlation is canceled.

Thereafter, if the transaction processing apparatus 1 is accessed again by the above-described information terminal device 2 and another cash register machine code is designated, the information terminal device 2 operates as a user interface device of a cash register machine different from the above.

(Replacement of Information Terminal Device 2)

Here, the information terminal device 2 with a terminal device code "01" is correlated with the cash register machine code "0001". When the transaction processing apparatus 1 and the information terminal device 2 with the terminal device code "01" are repeating the process same as, for example, ACT 210, ACT 108, ACT 109, and ACT 211, some error causes the information terminal device 2 to fail and the above-described operation cannot be continued. A procedure for replacing the information terminal device 2 in such a case will be described below.

Figure 8:
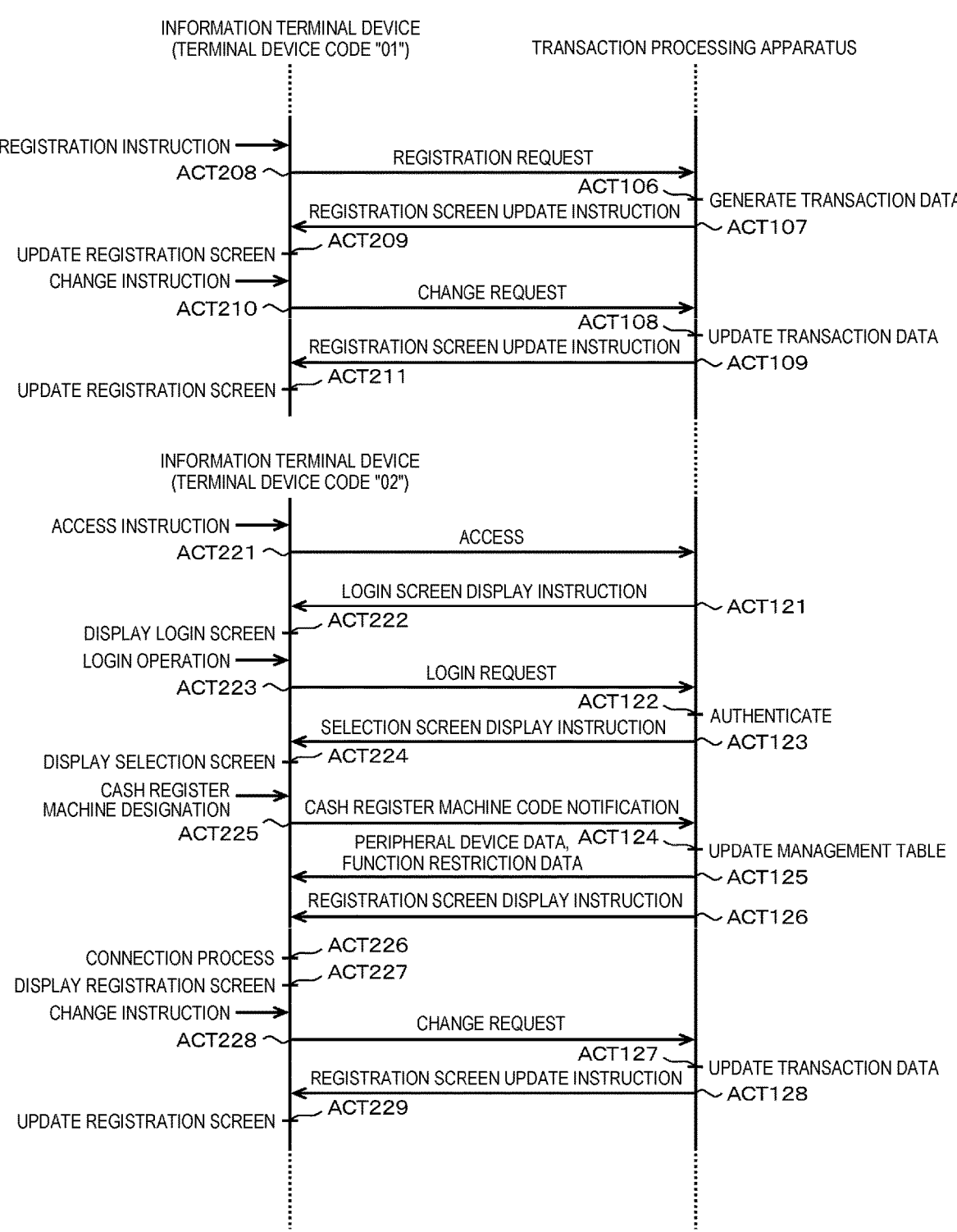
FIG. 8 is a sequence diagram showing an example of a procedure for the transaction processing apparatus to process a transaction when the information terminal device used as the user interface is changed halfway.

FIG. 8 is a sequence diagram showing an example of a procedure for the transaction processing apparatus 1 to process a transaction when the information terminal device 2 used as the user interface is changed halfway.

Here, procedures up to ACT 109 and ACT 211 proceed between the transaction processing apparatus 1 and the information terminal device 2 with the terminal device code "01" in the same manner as in FIG. 7. The information terminal device 2 with the terminal device code "01" is waiting for a change instruction or a payment instruction, and subsequent processes cannot be continued.

In such a case, for example, the store clerk instructs another information terminal device 2 with a terminal device code "02" to access the transaction processing apparatus 1. Upon receiving the access instruction, the information terminal device 2 with the terminal device code "02" proceeds to the following procedure together with the transaction processing apparatus 1.

The transaction processing apparatus 1 and the information terminal device 2 perform the processes same as ACT 101, ACT 102, ACT 103, ACT 201, ACT 202, ACT 203, and ACT 204 in FIG. 7, as ACT 121, ACT 122, ACT 123, ACT 221, ACT 222, ACT 223, and ACT 224.

The store clerk designates the cash register machine code "0001" on the selection screen. In response to this, the information terminal device 2 proceeds to ACT 225.

As ACT 225, the information terminal device 2 notifies the transaction processing apparatus 1 of the cash register machine code "0001" of the cash register machine designated as described above. Upon receiving the notification, the transaction processing apparatus 1 proceeds to ACT 124.

As ACT 124, the transaction processing apparatus 1 updates the management table TAB so as to correlate the information terminal device 2 with the cash register machine designated as described above, in the same manner as in ACT 104 in FIG. 7. In this case, the transaction processing apparatus 1 rewrites "01", which is already set in the field FCC in the data record REC in which "0001" is set in the field FCA in the management table TAB, to "02". In addition, the transaction processing apparatus 1 leaves the field FCB in the corresponding data record REC as it is, since data representing "in use" is already set.

As ACT 125, the transaction processing apparatus 1 transmits peripheral device data and function restriction data related to various devices belonging to the cash register machine designated as described above to the information terminal device 2, in the same manner as in ACT 105.

As ACT 126, the transaction processing apparatus 1 instructs the information terminal device 2 to display the registration screen displaying the list of the transaction commodities based on the transaction data DAA in which the cash register machine code "0001" is set in the field FDB, in the same manner as in ACT 107 or the like.

As ACT 226, the information terminal device 2 performs a connection process for enabling communication with various devices using the peripheral device data.

As ACT 227, the information terminal device 2 causes, for example, the touch panel 25 to display the registration screen in response to the above-described display instruction.

Thereafter, if the store clerk performs the above-described operation for instructing a change of the transaction commodity on the information terminal device 2 with the terminal device code "02", the information terminal device 2 proceeds to ACT 228.

As ACT 228, the information terminal device 2 requests the transaction processing apparatus 1 to change the transaction commodity in response to the above-described operation. Upon receiving the request, the transaction processing apparatus 1 proceeds to ACT 127.

As ACT 127, the transaction processing apparatus 1 updates, in response to the change request, the transaction data DAA generated in ACT 107, that is, the transaction data DAA generated in response to the request from the information terminal device 2 with the terminal device code "01".

As ACT 128, the transaction processing apparatus 1 instructs the information terminal device 2 with the terminal device code "02" to update the registration screen. Upon receiving the instruction, the information terminal device 2 proceeds to ACT 229.

As ACT 229, the information terminal device 2 updates the registration screen in response to the above-described instruction.

Thereafter, if the store clerk repeats the operation for the change instruction on the information terminal device 2 with the terminal device code "02", the transaction processing apparatus 1 and the information terminal device 2 repeat the processes same as ACT 228, ACT 127, ACT 128, and ACT 229.

As a result, the interrupted transaction process that is processed in response to the operation on the information terminal device 2 with the terminal device code "01" is continuously executed in response to the operation on the information terminal device 2 with the terminal device code "02". That is, the interrupted transaction process can be resumed without waiting for the recovery of the information terminal device 2 with the terminal device code "01".

(Editing of Cash Register Machine Master Database DBA)

Although not mentioned in the above-described description of the transaction process, the peripheral device 4, the drawer 5, and the settlement terminal 6 are controlled during the above-described process, such as an operation for a printer to print a receipt. The control is performed from the transaction processing apparatus 1 via the communication network 8 or from the information terminal device 2 via the communication network 8. For this control, the transaction processing apparatus 1 manages the configuration of each cash register machine by the cash register machine master database DBA, and sends peripheral device data related to usable peripheral devices to the information terminal device 2. That is, the processor 11 executes the information process based on the transaction processing program PRA, so that the processor 11 functions as a device management unit for managing the device used as the peripheral device of the information terminal device 2 using the cash register machine master database DBA.

Therefore, if the configuration of the cash register machine is changed, it is necessary to update the cash register machine master database DBA.

If editing of the cash register machine master database DBA is requested in response to an access from the management terminal 7, the processor 11 of the transaction processing apparatus 1 executes an information process for editing the cash register machine master database DBA (hereinafter referred to as a cash register machine editing process) based on the transaction processing program PRA. The transaction process and the cash register machine editing process may be executed based on separate information processing programs. Although not shown, it is preferable that the processor 11 performs an authentication process that an operator of the management terminal 7 is an administrator who has an authority to edit the cash register machine master database DBA, and starts the cash register machine editing process only if the authentication is successful.

It is assumed that the access to the transaction processing apparatus 1 from the management terminal 7 is performed using, for example, a web browser. However, a dedicated application for accessing the transaction processing apparatus 1 may be used.

FIG. 9 is a flowchart showing the cash register machine editing process.

As ACT 301, the processor 11 controls the communication unit 14 to transmit to the management terminal 7 an instruction to display a cash register machine list screen. In response to the instruction, the management terminal 7 displays the cash register machine list screen. The cash register machine list screen is a screen displaying a list of cash register machines correlated with the respective data records REA included in the cash register machine master database DBA. The cash register machine list screen is also a screen for instructing to start editing the cash register machine master database DBA.

FIG. 10 is a diagram showing an example of the cash register machine list screen. The cash register machine list screen shown in FIG. 10 is an example in a case where seven data records REA are included in the cash register machine master database DBA, that is, in a state in which seven cash register machines are set. The cash register machine list screen displays a cash register machine code and name for each cash register machine, and a scene code and name of a payment scene by character strings on the same row. The cash register machine list screen displays a button BUA in each row. The button BUA is a soft key for receiving an instruction to start editing related to the cash register machine displayed on the same row.

The administrator selects a cash register machine to be edited from the cash register machines displayed on the cash register machine list screen. Then, the administrator designates the cash register machine to be edited by a predetermined operation such as tapping the button BUA corresponding to the cash register machine. If such a designation is made, the management terminal 7 notifies the transaction processing apparatus 1 of a cash register machine code of the designated cash register machine.

If the display instruction in ACT 301 in FIG. 9 is completed, the processor 11 proceeds to ACT 302.

As ACT 302, the processor 11 waits for designation of one of the cash register machines. If the cash register machine code is notified from the management terminal 7 as described above, the processor 11 determines YES in ACT 302 and proceeds to ACT 303.

As ACT 303, the processor 11 generates editing data for temporarily recording the editing content. For example, the processor 11 copies the data record REA correlated with the cash register machine to be edited among the data records REA included in the cash register machine master database DBA to obtain the editing data.

As ACT 304, the processor 11 controls the communication unit 14 to transmit to the management terminal 7 an instruction to display a configuration editing screen. In response to the instruction, the management terminal 7 displays the configuration editing screen. The configuration editing screen is a screen for receiving an operation for editing a setting related to the configuration of the above-designated cash register machine. The configuration editing screen is a screen for editing information on the fields FAB, FAC, . . . , which are associated with the cash register machine code, for the data record REA included in the cash register machine master database DBA.

FIG. 11 is a diagram showing an example of the configuration editing screen. The configuration editing screen displays a setting status related to the configuration of the cash register machine to be edited in a display area ARA. The configuration editing screen displays buttons BUB, BUC, and BUD. The button BUB is a soft key for instructing to delete the setting related to the configuration of the cash register machine to be edited. The button BUC is a soft key for instructing to cancel editing and return to a display state of the cash register machine list screen. The button BUD is a soft key for instructing to save the setting displayed in the display area ARA.

If the display instruction in ACT 304 in FIG. 9 is completed, the processor 11 proceeds to ACT 305.

As ACT 305, the processor 11 confirms whether it is notified that the operation for editing is performed. If the corresponding event cannot be confirmed, the processor 11 determines NO and proceeds to ACT 306.

As ACT 306, the processor 11 confirms whether return is requested. If the corresponding event cannot be confirmed, the processor 11 determines NO and proceeds to ACT 307.

As ACT 307, the processor 11 confirms whether saving of the editing content is requested. If the corresponding event cannot be confirmed, the processor 11 determines NO and proceeds to ACT 308.

As ACT 308, the processor 11 confirms whether deletion of the cash register machine to be edited is requested. If the corresponding event cannot be confirmed, the processor 11 determines NO and returns to ACT 305.

Thus, the processor 11 waits for any one of the editing operation, the return request, the saving request, and the deletion request to be performed in ACT 305 to ACT 308.

On the management terminal 7, the administrator performs a predetermined operation for changing various settings related to the configuration of the cash register machine to be edited, such as tapping a radio button displayed in the display area ARA of the configuration editing screen or a predetermined operation for editing a character string displayed in the display area ARA.

For example, the cash register machine name can be set by directly inputting a text. For the payment scene, a payment scene prepared in advance can be set in a selection format. In the configuration editing screen, the scene code and the scene name set in the fields FBA and FBB in the data record REC correlated with each payment scene in the function restriction table TAA are represented side by side as "A: stationary face-to-face semi". For an IOBOX connection and IOBOX address, a setting of "Yes" or "No" for the connection of the input and output device 3 and connection setting information in the case of "Yes" are set. For a coin machine connection and model, a setting of "Yes" or "No" for the coin machine connection and a model in the case of Yes are set. For a settlement terminal connection and settlement terminal address, a setting of "Yes" or "No" for the settlement terminal connection and connection setting information in the case of "Yes" are set. If a plurality of settlement terminals are connected, a plurality of settlement terminal connections and a plurality of settlement terminal addresses are set. Similarly, for a printer connection and printer name, and a scanner connection and scanner name, a setting of "Yes" or "No" and a device name or connection setting information in the case of "Yes" are set.

The management terminal 7 requests the transaction processing apparatus 1 to change the setting along with a notification of the content of the operation. Upon receiving the request, the processor 11 determines YES in ACT 305 and proceeds to ACT 309.

As ACT 309, the processor 11 updates the editing data in response to the above-described operation.

As ACT 310, the processor 11 instructs the management terminal 7 to update the configuration editing screen to display the setting status represented by the updated editing data. Then, the processor 11 returns to a standby state of ACT 305 to ACT 308. The management terminal 7 updates the configuration editing screen displayed in response to the above-described instruction.

If the administrator decides to cancel the change of various settings related to the configuration of the cash register machine to be edited, the administrator instructs to return by a predetermined operation such as tapping the button BUC displayed on the configuration editing screen. In response to the instruction, the management terminal 7 requests the transaction processing apparatus 1 to return. Upon receiving the request, the processor 11 determines YES in ACT 306, returns to ACT 301, and repeats the subsequent processes again in the same manner as described above.

If the administrator decides to save an editing result, the administrator instructs to save the editing result by a predetermined operation such as tapping the button BUD displayed on the configuration editing screen. In response to the instruction, the management terminal 7 requests the transaction processing apparatus 1 to save the editing result. Upon receiving the request, the processor 11 determines YES in ACT 307 and proceeds to ACT 311.

As ACT 311, the processor 11 updates the cash register machine master database DBA to reflect the editing content. For example, the processor 11 overwrites the data record REA correlated with the cash register machine to be edited with the editing data. Then, the processor 11 returns to ACT 301 and repeats the subsequent processes again in the same manner as described above.

If the administrator decides to delete the cash register machine to be edited, the administrator instructs to delete the cash register machine to be edited by a predetermined operation such as tapping the button BUB displayed on the configuration editing screen. In response to the instruction, the management terminal 7 requests the transaction processing apparatus 1 to delete the cash register machine to be edited. Upon receiving the request, the processor 11 determines YES in ACT 308 and proceeds to ACT 312.

As ACT 312, the processor 11 deletes the data record REA correlated with the cash register machine to be edited from the cash register machine master database DBA. Then, the processor 11 returns to ACT 301 and repeats the subsequent processes again in the same manner as described above. Before executing ACT 312, the processor 11 may cause the management terminal 7 to display a screen for prompting confirmation as to whether to execute the deletion, and proceed to ACT 312 only if it can be confirmed that an operation for instructing to execute the deletion is performed on the management terminal 7.

The processor 11 may generate editing data representing a predetermined default setting in response to an operation for instruction to add a setting related to a new cash register machine performed on the management terminal 7, and then execute the process in ACT 305 and subsequent processes. In this case, in ACT 311, the processor 11 sets the editing data as the new data record REA and adds the new data record REA to the cash register machine master database DBA.

(Editing of Function Restriction Table)

Execution of various other functions that are not executed in the above-described description of the transaction process may be required in response to an execution instruction from the store clerk on the information terminal device 2 or in response to establishment of a predetermined execution condition for another process. At this time, the transaction processing apparatus 1 or the information terminal device 2 refers to the function restriction table TAA or the notified function restriction data, and does not execute the function that is disabled for the payment scene of the information terminal device 2. That is, the processor 11 executes the information process based on the transaction processing program PRA, so that the processor 11 functions as a function management unit for managing whether to permit execution of various functions using the function restriction table TAA.

The processor 11 determines, as the above-described payment scene of the information terminal device 2, a payment scene identified by the scene code correlated with the cash register machine master database DBA for the cash register machine code correlated with the information terminal device 2 in the management table TAB. That is, the processor 11 executes the information process based on the transaction processing program PRA, so that the processor 11 functions as a scene management unit for managing a correlation between the cash register machine code and the payment scene using the cash register machine master database DBA.

The function restriction table TAA is determined according to the management policy of each store as described above, and may need to be updated in accordance with a change in the management policy.

If editing of the function restriction table TAA is requested in response to an access from the management terminal 7, the processor 11 of the transaction processing apparatus 1 executes an information process for editing the function restriction table TAA based on the transaction processing program PRA (hereinafter, referred to as a function setting editing process). The transaction process and the function setting editing process may be executed based on separate information processing programs. Although not shown, it is preferable that the processor 11 performs an authentication process that the operator of the management terminal 7 is a person who has an authority to edit the function restriction table TAA, and starts the function setting editing process only if the authentication is successful.

Figure 12:
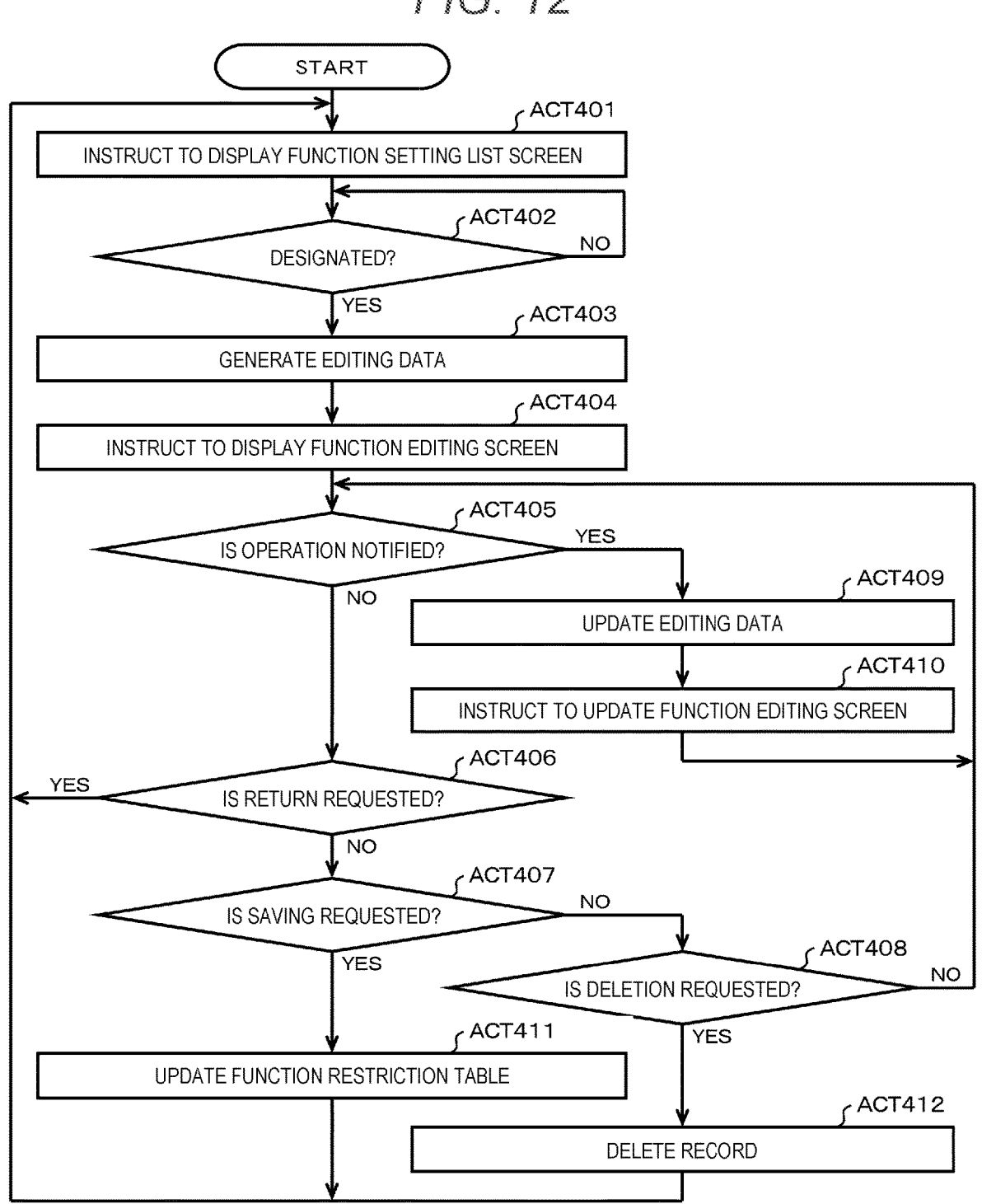
FIG. 12 is a flowchart showing a function setting editing process.

FIG. 12 is a flowchart showing the function setting editing process.

As ACT 401, the processor 11 instructs the management terminal 7 to display a function setting list screen. In response to the instruction, the management terminal 7 displays the function setting list screen. The function setting list screen is a screen displaying a list of setting statuses of function restrictions for each payment scene.

FIG. 13 is a diagram showing an example of the function setting list screen. The function setting list screen shown in FIG. 13 is an example in which five data records REB are included in the function restriction table TAA, that is, five payment scenes are set. The function setting list screen displays a payment scene code and name, and enable or disable of various functions for each payment scene by character strings on the same row, and also displays buttons BUE. The button BUE is a soft key for receiving an instruction to start editing the function restriction setting.

The administrator selects a payment scene to be edited from the payment scenes displayed on the function setting list screen. Then, the administrator designates the payment scene to be edited by a predetermined operation such as tapping the button BUE corresponding to the payment scene. If such a designation is made, the management terminal 7 notifies the transaction processing apparatus 1 of a scene code of the designated payment scene.

If the display instruction in ACT 401 in FIG. 12 is completed, the processor 11 proceeds to ACT 402.

As ACT 402, the processor 11 waits for designation of one of the payment scenes. If the scene code is notified from the management terminal 7 as described above, the processor 11 determines YES in ACT 402 and proceeds to ACT 403.

As ACT 403, the processor 11 generates editing data for temporarily recording the editing content. For example, the processor 11 copies the data record REB correlated with the payment scene to be edited among the data records REB included in the function restriction table TAA to obtain the editing data.

As ACT 404, the processor 11 instructs the management terminal 7 to display a function setting screen. In response to the instruction, the management terminal 7 displays the function setting screen. The function setting screen is a screen for receiving an operation for editing the setting related to function restriction for the above-designated payment scene.

FIG. 14 is a diagram showing an example of the function setting screen for each scene. The function setting screen displays, in a display area ARB, a setting status related to the function restriction for the payment scene to be edited. The function setting screen includes buttons BUF, BUG, and BUH. The button BUF is a soft key for instructing to delete the payment scene to be edited. The button BUG is a soft key for instructing to cancel editing and return to a display state of the function setting list screen. The button BUH is a soft key for instructing to save the setting displayed in the display area ARB.

If the display instruction in ACT 404 in FIG. 12 is completed, the processor 11 proceeds to ACT 405.

As ACT 405, the processor 11 confirms whether it is notified that the operation for editing is performed. If the corresponding event cannot be confirmed, the processor 11 determines NO and proceeds to ACT 406.

As ACT 406, the processor 11 confirms whether return is requested. If the corresponding event cannot be confirmed, the processor 11 determines NO and proceeds to ACT 407.

As ACT 407, the processor 11 confirms whether saving of the editing content is requested. If the corresponding event cannot be confirmed, the processor 11 determines NO and proceeds to ACT 408.

As ACT 408, the processor 11 confirms whether deletion of the cash register machine to be edited is requested. If the corresponding event cannot be confirmed, the processor 11 determines NO and returns to ACT 405.

Thus, the processor 11 waits for any one of the editing operation, the return request, the saving request, and the deletion request to be performed in ACT 405 to ACT 408.

On the management terminal 7, the administrator performs a predetermined operation for changing various settings related to the function restriction for the payment scene to be edited, such as tapping a radio button displayed in the display area ARB of the function setting screen. The management terminal 7 requests the transaction processing apparatus 1 to change the setting along with a notification of the content of the operation. Upon receiving the request, the processor 11 determines YES in ACT 405 and proceeds to ACT 409.

As ACT 409, the processor 11 updates the editing data in response to the above-described operation.

As ACT 410, the processor 11 instructs the management terminal 7 to update the function setting screen to display the setting status represented by the updated editing data. Thereafter, the processor 11 returns to a standby state of ACT 405 to ACT 408. The management terminal 7 updates the function setting screen displayed in response to the above-described instruction.

If the administrator decides to cancel changing the various settings related to the function restriction for the payment scene to be edited, the administrator instructs to return by a predetermined operation such as tapping the button BUG displayed on the function setting screen. In response to the instruction, the management terminal 7 requests the transaction processing apparatus 1 to return. Upon receiving the request, the processor 11 determines YES in ACT 406, returns to ACT 401, and repeats the subsequent processes again in the same manner as described above.

If the administrator decides to save an editing result, the administrator instructs to save the editing result by a predetermined operation such as tapping the button BUH displayed on the function setting screen. In response to the instruction, the management terminal 7 requests the transaction processing apparatus 1 to save the editing result. Upon receiving the request, the processor 11 determines YES in ACT 407 and proceeds to ACT 411.

As ACT 411, the processor 11 updates the function restriction table TAA to reflect the editing content. For example, the processor 11 overwrites the data record REB correlated with the payment scene to be edited with the editing data. Thereafter, the processor 11 returns to ACT 401 and repeats the subsequent processes again in the same manner as described above.

If the administrator decides to delete the payment scene to be edited, the administrator instructs to delete the payment scene to be edited by a predetermined operation such as tapping the button BUF displayed on the function setting screen. In response to the instruction, the management terminal 7 requests the transaction processing apparatus 1 to delete the payment scene to be edited. Upon receiving the request, the processor 11 determines YES in ACT 408 and proceeds to ACT 412.

As ACT 412, the processor 11 deletes the data record REB correlated with the payment scene to be edited from the function restriction table TAA. Then, the processor 11 returns to ACT 401 and repeats the subsequent processes again in the same manner as described above. Before executing ACT 412, the processor 11 may cause the management terminal 7 to display a screen for prompting confirmation as to whether to execute the deletion, and may proceed to ACT 412 only if it can be confirmed that an operation for instructing to execute the deletion is performed on the management terminal 7.

The processor 11 may generate editing data representing a predetermined default setting in response to an operation for instructing to add a new payment scene input performed on the management terminal 7, and then execute the process in ACT 405 and subsequent processes. In this case, in ACT 411, the processor 11 adds the editing data as a new data record REB to the function restriction table TAA.

As described above, the transaction processing apparatus 1 manages the correlation between the information terminal device 2 and the cash register machine code, and processes the transaction determined in response to the operation on the information terminal device 2 as the transaction related to the cash register machine code correlated with the information terminal device 2. Thus, by changing the information terminal device 2 correlated with the cash register machine code, the information terminal device 2 used for receiving an operation related to one transaction can be changed, and a process of a transaction that is processed in response to the operation using the information terminal device can be continued even if the information terminal device 2 fails.

The transaction processing apparatus 1 manages the devices used in each cash register machine by using the cash register machine master database DBA in correlation with the cash register machine code, and updates the cash register machine master database DBA as appropriate in response to the instruction from the administrator. Accordingly, the configuration of the cash register machine can be easily changed.

The transaction processing apparatus 1 manages which functions are permitted to be executed for each payment scene using the function restriction table TAA, and updates the function restriction table TAA as appropriate in response to the instruction from the administrator. Accordingly, the restriction of the function permitted to be executed for each payment scene can be easily changed.

The above-described embodiments can be modified in various ways as follows.

At least one of the cash register machine master database DBA, the function restriction table TAA, the management table TAB, and the transaction data DAA may be stored in a storage device provided outside the transaction processing apparatus 1.

The processor 11 of the transaction processing apparatus 1 may determine whether to execute the function whose use can be restricted by the setting in the function restriction table TAA. For example, even if the use of the terminal camera scan function is restricted, the barcode scan by the camera provided in the information terminal device 2 is permitted in the information terminal device 2. Then, when receiving the registration request in response to the barcode scan, the transaction processing apparatus 1 may reject the registration request.

For example, a user interface device such as a touch panel is provided in the transaction processing apparatus 1, and the user interface device may be used to provide a user interface for editing.

The peripheral device 4, the drawer 5, and the settlement terminal 6 may be directly wired or wirelessly connected to the transaction processing apparatus 1 or the information terminal device 2 without using the communication network 8. In such a case, the transaction processing apparatus 1 controls those devices connected to the transaction processing apparatus 1, and the information terminal device 2 controls the devices connected to the information terminal device 2.

The transaction processing system shown in FIG. 1 is an example in which the peripheral device 4 is connected to the communication network 8 with the input and output device 3 therebetween and the drawer 5 and the settlement terminal 6 are directly connected to the communication network 8 in the permanent payment area and the service counter. However, how each device is connected to the communication network 8 can be changed as appropriate.

For example, if the cash register machine identified by the cash register machine code notified in ACT 205 or the like in FIG. 7 is "in use", the transaction processing apparatus 1 may perform a process as an error. That is, for example, if the data set in the field FCB in the data record REC in which the notified cash register machine code is set in the field FCA represents "in use", the transaction processing apparatus 1 returns, to the information terminal device 2, an error notification or a notification indicating that the cash register machine is in use. In such a case, the information terminal device 2 causes the touch panel 25 to display a screen indicating that the designated cash register machine is in use.

The transaction processing apparatus 1 or the information terminal device 2 may not be able to select a cash register machine in use on the selection screen. Specifically, for example, the transaction processing apparatus 1 or the information terminal device 2 reads the data record REC in which the data set in the field FCB represents "unused" from the management table TAB, and generates a selection screen as a screen indicating only the cash register machine correlated with the corresponding data record REC as options. Alternatively, for example, the transaction processing apparatus 1 or the information terminal device 2 generates a selection screen as a screen in which all the data records REC in the management table TAB display the list of the cash register machines correlated with the respective data records REC, but the cash register machines correlated with the data records REC in which the data set in the field FCB represents "in use" are grayed out and cannot be selected.

The transaction processing apparatus 1 may monitor the state of the information terminal device 2 or monitor a communication log or the like from the information terminal device 2 to the transaction processing apparatus 1 to confirm whether each cash register machine is operating normally and prevent the cash register machine that is operating normally and that is "in use" from being selected on the selection screen. At this time, the transaction processing apparatus 1 may cause the information terminal device 2 other than the one used by the cash register machine to display that an abnormality occurs in the cash register machine that is "in use" and that is not operating normally.

If the cash register machine designated by the information terminal device 2 is "in use", the transaction processing apparatus 1 may forcibly correlate the information terminal device 2 by which the cash register machine is designated (hereinafter, referred to as a second information terminal device in the description of this paragraph), instead of the information terminal device 2 previously correlated with the designated cash register machine (hereinafter, referred to as a first information terminal device in the description of this paragraph). At this time, the transaction processing apparatus 1 may transmit an inquiry to the first information terminal device, and if the inquiry is not rejected, switching to the second information terminal device may be performed. Specifically, an inquiry screen such as pop up for requesting permission may be displayed on the first information terminal device "in use" when the transaction processing apparatus 1 transmits an inquiry, and switching may be performed from the first information terminal device to the second information terminal device if a response of permission is detected from the first information terminal device by the store clerk operating the inquiry screen. A case in which the inquiry is not rejected includes, for example, a case in which the transaction processing apparatus 1 transmits an inquiry to the first information terminal device if there is a designation of a cash register machine from the second information terminal device, but there is no response from the first information terminal device even after a certain period of time is elapsed due to a case in which a failure or the like occurs in the first information terminal device and a case in which there is no operator or the like. If the information terminal device 2 is configured so as to be able to confirm whether the information terminal device 2 is operating normally as described above, the cash register machine "in use", which can be grasped as not operating normally, may be switched to the second information terminal device without making an inquiry to the first information terminal device.

In the data record REB included in the function restriction table TAA, for example, a field for setting data representing an applicable range such as "store unit", "store group", and "common to all stores" may be added. The function settings for the same payment scene may be set with respect to a plurality of application ranges. The "store unit" indicates that, for example, the function settings can be individually set in correlation with each of a plurality of stores, and only the correlated store is in the application range. The "store group" indicates that the function settings can be individually set in correlation with each of a plurality of store groups determined by dividing the plurality of stores into several groups, and only the store belonging to the correlated store group is in the applicable range. The "common to all stores" indicates that only one function setting is applicable to all stores. If a plurality of application ranges are defined for the same payment scene, the application range is selected according to a predetermined priority order. For example, the priority order is determined as "store unit" >"store group unit">"common to all stores" in the descending order. If there are two stores A and B belonging to the same group, the function settings are made for the group, the function settings in the store unit are made for the store A, and the function settings in the store unit are not made for the store B, the store A applies the function settings in the store unit for the store A, and the store B applies the function settings in the store group for the group to which the store B belongs.

The transaction to be processed is not limited to purchase and sale of a commodity, and may be various other transactions.

Some or all of the functions implemented by the processor 11 by the information process may also be implemented by hardware that executes an information process not based on a program such as a logic circuit. The functions described above can also be implemented by combining software control with hardware such as the above-described logic circuit.

While certain embodiments have been described, these embodiments have been presented by way of example only, and are not intended to limit the scope of the disclosure. Such new embodiments can be implemented in other various forms, and various omissions, replacements, and changes can be made without departing from the spirit of the disclosure. The embodiments and the modification thereof are included in the scope and the spirit of the disclosure and are also included in the disclosure described in the scope of claims and an equivalent scope thereof.

What is claimed is:

1. A sales transaction processing system, comprising:
a plurality of terminals installed in a store and configured to register an item for purchase in a sales transaction;
a plurality of first devices connectable to the terminals for executing the sales transaction; and
a sales transaction processing apparatus including:
  a communication interface connectable to the terminals and the first devices,
  a memory that stores first data that associates each of the terminals with one of the first devices, and
  a processor configured to:
    upon receipt of a notification indicating one of the first devices from a first terminal, update the first data to associate the first terminal with said one of the first devices,
    upon receipt of a registration request from the first terminal, generate second data that associates an in-progress sales transaction with said one of the first devices and store the second data in the memory, and
    upon receipt of a change request from a second terminal requesting association with said one of the first devices previously associated with the first terminal,
      update the first data to disassociate the first terminal and associate the second terminal with said one of the first devices, and
      control the communication interface to transmit an instruction to the second terminal to resume the in-progress sales transaction based on the second data.

2. The sales transaction processing system according to claim 1, wherein
the notification indicates an identifier of a cash register machine including said one of the first devices, and the first data associates the identifier of the cash register machine with an identifier of the first terminal.

3. The sales transaction processing system according to claim 1, wherein the processor is configured to perform the sales transaction in communication with said one of the first devices.

4. The sales transaction processing system according to claim 1, further comprising:

a plurality of second devices connectable to the terminals for executing the sales transaction and each used together with one of the first devices, wherein the memory stores third data that associates each of the first devices with a corresponding one of the second devices, and the processor is configured to, in response to an instruction, update the third data to modify the association between the first and second devices.

5. The sales transaction processing system according to claim 1, wherein the memory stores:

fourth data indicating one or more transactional functions that can be performed for each of payment scenes, and fifth data that associates each of the terminals with one of the scenes, and the processor is configured to determine whether to perform one of the transactional functions requested by a terminal based on the fourth and fifth data.

6. The sales transaction processing system according to claim 5, wherein the processor is configured to, in response to an instruction, update the fourth data to modify the association between the transactional functions and the payment scenes.

7. The sales transaction processing system according to claim 5, wherein each of the payment scenes corresponds to an area in the store in which a payment process in a sales transaction is performed.

8. The sales transaction processing system according to claim 1, wherein the first devices include a peripheral device, a cash register drawer, and a settlement terminal.

9. A sales transaction processing apparatus, comprising:

a communication interface connectable to:

a plurality of terminals installed in a store and configured to register an item for purchase in a sales transaction, and a plurality of first devices connectable to the terminals for executing the sales transaction;

a memory that stores first data that associates each of the terminals with one of the first devices; and a processor configured to:

upon receipt of a notification indicating one of the first devices from a first terminal, update the first data to associate the first terminal with said one of the first devices, upon receipt of a registration request from the first terminal, generate second data that associates an in-progress sales transaction with said one of the first devices and store the second data in the memory, and upon receipt of a change request from a second terminal requesting association with said one of the first devices previously associated with the first terminal, update the first data to disassociate the first terminal and associate the second terminal with said one of the first devices, and control the communication interface to transmit an instruction to the second terminal to resume the in-progress sales transaction based on the second data.

10. The sales transaction processing apparatus according to claim 9, wherein the notification indicates an identifier of a cash register machine including said one of the first devices, and the first data associates the identifier of the cash register machine with an identifier of the first terminal.

11. The sales transaction processing apparatus according to claim 9, wherein the processor is configured to perform the sales transaction in communication with said one of the first devices.

12. The sales transaction processing apparatus according to claim 9, wherein the communication interface is connectable to a plurality of second devices connectable to the terminals for executing the sales transaction and each used together with one of the first devices, the memory stores third data that associates each of the first devices with a corresponding one of the second devices, and the processor is configured to, in response to an instruction, update the third data to modify the association between the first and second devices.

13. The sales transaction processing apparatus according to claim 9, wherein the memory stores:

fourth data indicating one or more transactional functions that can be performed for each of payment scenes, and fifth data that associates each of the terminals with one of the scenes, and the processor is configured to determine whether to perform one of the transactional functions requested by a terminal based on the fourth and fifth data.

14. The sales transaction processing apparatus according to claim 13, wherein the processor is configured to, in response to an instruction, update the fourth data to modify the association between the transactional functions and the payment scenes.

15. The sales transaction processing apparatus according to claim 13, wherein each of the payment scenes corresponds to an area in the store in which a payment process in a sales transaction is performed.

16. The sales transaction processing apparatus according to claim 9, wherein the first devices include a peripheral device, a cash register drawer, and a settlement terminal.

17. A method performed by a sales transaction processing apparatus, the method comprising:

storing, in a memory, first data that associates each of a plurality of terminals with one of a plurality of first devices, the terminals being installed in a store and configured to register an item for purchase in a sales transaction, and the first devices being connectable to the terminals for executing the sales transaction;

upon receipt of a notification indicating one of the first devices from a first terminal, updating the first data to associate the first terminal with said one of the first devices;

upon receipt of a registration request from the first terminal, generating second data that associates an in-progress sales transaction with said one of the first devices and storing the second data in the memory, wherein the second data is maintained in the memory independently of the first terminal; and upon receipt of a change request from a second terminal requesting association with said one of the first devices previously associated with the first terminal, updating the first data to disassociate the first terminal and associate the second terminal with said one of the first devices, and transmitting an instruction to the second terminal to resume the in-progress sales transaction based on the second data.

18. The method according to claim 17, wherein the notification indicates an identifier of a cash register machine including said one of the first devices, and the first data associates the identifier of the cash register machine with an identifier of the first terminal.

19. The method according to claim 17, further comprising:

performing the sales transaction in communication with said one of the first devices.

20. The method according to claim 17, further comprising:

storing in the memory third data that associates each of the first devices with a corresponding one of a plurality of second devices connectable to the terminals for executing the sales transaction and each used together with one of the first devices; and in response to an instruction, updating the third data to modify the association between the first and second devices.

* * * * *